US012592060B2

(12) United States Patent
Hwang et al.

(10) Patent No.: US 12,592,060 B2
(45) Date of Patent: Mar. 31, 2026

(54) ARTIFICIAL INTELLIGENCE DEVICE AND 3D AGENCY GENERATING METHOD THEREOF

(71) Applicant: LG ELECTRONICS INC., Seoul (KR)

(72) Inventors: Taeju Hwang, Seoul (KR); Jongjin Park, Seoul (KR); Yubin Yoon, Seoul (KR); Taehwan Hwang, Seoul (KR); Hyoyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 18/199,017

(22) Filed: May 18, 2023

(65) Prior Publication Data

US 2024/0203099 A1 Jun. 20, 2024

(30) Foreign Application Priority Data

Dec. 15, 2022 (WO) ................ PCT/KR2022/020516

(51) Int. Cl.
*G06V 10/774* (2022.01)
*G06N 3/08* (2023.01)
(Continued)

(52) U.S. Cl.
CPC ............. *G06V 10/774* (2022.01); *G06N 3/08* (2013.01); *G06T 13/40* (2013.01); *G06V 10/235* (2022.01);
(Continued)

(58) Field of Classification Search
CPC ........ G06N 3/08; G06T 13/40; G06V 10/235; G06V 10/774; G06V 10/7715;
(Continued)

(56) References Cited

U.S. PATENT DOCUMENTS

2020/0410731 A1 12/2020 Chen et al.
2021/0295579 A1* 9/2021 Davis ..................... G06F 30/20
(Continued)

FOREIGN PATENT DOCUMENTS

KR 102118519 6/2020
KR 1020210001859 1/2021
(Continued)

OTHER PUBLICATIONS

Cudeiro et al. "Capture, Learning, and Synthesis of 3D Speaking Styles," 2019 IEEE/CVF Conference on Computer Vision and Pattern Recognition (CVPR), Long Beach, CA, USA, 2019, p. 10093-10103, accessed Sep. 5, 2025 via <https://ieeexplore.IEEE.org/document/8954000> (Year: 2019).*
(Continued)

*Primary Examiner* — John Villecco
*Assistant Examiner* — Joshua B. Crockett
(74) *Attorney, Agent, or Firm* — LEE, HONG, DEGERMAN, KANG & WAIMEY

(57) ABSTRACT

A three-dimensional agency generating method of an artificial intelligence device according to an embodiment of the present disclosure may include: acquiring a two-dimensional image including a target persona; pre-processing the two-dimensional image to extract a training dataset including voice information, face information, and motion information corresponding to the target persona; inputting the training dataset to an agency generation model to learn motion features of the target persona; confirming whether user input data for generating the three-dimensional agency is received; and when the user input data for generating the three-dimensional agency is received, inputting the user input data to the pre-trained agency generation model to generate the three-dimensional agency expressing the motion features of the target persona.

13 Claims, 17 Drawing Sheets

(51) Int. Cl.

| | |
|---|---|
| *G06T 13/40* | (2011.01) |
| *G06V 10/22* | (2022.01) |
| *G06V 10/77* | (2022.01) |
| *G06V 10/82* | (2022.01) |
| *G06V 20/64* | (2022.01) |
| *G06V 40/20* | (2022.01) |
| *G10L 13/00* | (2006.01) |
| *G10L 17/02* | (2013.01) |
| *G10L 17/04* | (2013.01) |

(52) U.S. Cl.
CPC .......... *G06V 10/7715* (2022.01); *G06V 10/82* (2022.01); *G06V 20/647* (2022.01); *G06V 40/20* (2022.01); *G10L 13/00* (2013.01); *G10L 17/02* (2013.01); *G10L 17/04* (2013.01)

(58) Field of Classification Search
CPC ...... G06V 10/82; G06V 20/647; G06V 40/20; G10L 13/00; G10L 17/02; G10L 17/04
See application file for complete search history.

(56) References Cited

U.S. PATENT DOCUMENTS

| | | | |
|---|---|---|---|
| 2021/0312683 A1 | 10/2021 | Linton et al. | |
| 2021/0390713 A1* | 12/2021 | Che | G06N 3/08 |
| 2022/0012940 A1 | 1/2022 | Park et al. | |

FOREIGN PATENT DOCUMENTS

| | | |
|---|---|---|
| KR | 102358464 | 2/2022 |
| WO | 2021099003 | 5/2021 |

OTHER PUBLICATIONS

Yi et al. "Audio-driven Talking Face Video Generation with Learning-based Personalized Head Pose", arXiv.org, Mar. 5, 2020, accessed on Sep. 2, 2025 via <https://arxiv.org/abs/2002.10137> (Year: 2020).*

Habibie et al. "Learning Speech-driven 3D Conversational Gestures from Video", ACM Digital Library, Sep. 14, 2021, accessed Sep. 2, 2025 via <https://dl.acm.org/doi/10.1145/3472306.3478335> (Year: 2021).*

Wang et al. "AnyoneNet: Synchronized Speech and Talking Head Generation for Arbitrary Persons, " in IEEE Transactions on Multimedia, vol. 25, pp. 6717-6728, 2023, published Oct. 12, 2022, accessed Sep. 3, 2025 via <https://ieeexplore.IEEE.org/document/9917325> (Year: 2022).*

Habibie et al., "A Motion Matching-based Framework for Controllable Gesture Synthesis from Speech", SIGGRAH '22 Conference Proceedings, Aug. 2022, 8 pages.

Fan et al., "FaceFormer: Speech-Driven 3D Facial Animation with Transformers", arXiv:2112.05329v4 [cs.CV], Mar. 2022, 13 pages.

PCT International Application No. PCT/KR2022/020516, International Search Report dated Aug. 25, 2023, 9 pages.

* cited by examiner

FIG. 13

User Input Data
(Identification Code, Audio-related Basic Data, Motion Control Level)

530

Pre-trained Agency Generation Model

Generate 3D agency

80

| Target Persona List | |
|---|---|
| Representative Name of Target Persona | Identification Code |
| Hong, Jin-Kyung | 0001 |
| Ma, Dong-Seok | 0002 |
| . | . |
| . | . |
| . | . |

82

84

80

84

| Target Persona List | | |
|---|---|---|
| Representative Name of Target Persona | Identification Code | Representative Image |
| Hong, Jin-Kyong | 0001 | |
| Ma, Dong-Suk | 0002 | |
| . | . | . |
| . | . | . |
| . | . | . |

82

86

ARTIFICIAL INTELLIGENCE DEVICE AND 3D AGENCY GENERATING METHOD THEREOF

CROSS-REFERENCE TO RELATED APPLICATIONS

Pursuant to 35 U.S.C. § 119, this application claims the benefit of an earlier filing date and right of priority to International Application No. PCT/KR2022/020516, filed on Dec. 15, 2022, the contents of which are hereby incorporated by reference herein in its entirety.

BACKGROUND

The present disclosure relates to an artificial intelligence device, which is capable of generating a three-dimensional (3D) agency having motion features of a target persona, and a 3D agency generating method thereof.

In general, artificial intelligence is a field of computer science and information technology that studies methods to enable computers to do thinking, learning, and self-development that can be done with human intelligence, and means enabling computers to mimic human intelligent behavior.

In addition, artificial intelligence does not exist by itself, but has many direct and indirect relationships with other fields of computer science. In particular, in modern times, attempts to introduce artificial intelligence elements in various fields of information technology and use them to solve problems in those fields are being very actively made.

On the other hand, technologies for recognizing and learning surrounding situations by using artificial intelligence, providing information desired by the user in a desired form, or performing operations or functions desired by the user are being actively studied.

An electronic device that provides such various operations and functions may be referred to as an artificial intelligence device.

Recently, artificial intelligence technology capable of learning a two-dimensional (2D) image by using artificial intelligence and implementing a target object as a three-dimensional (3D) image from the learned 2D image has been studied.

However, in such artificial intelligence technologies, all parts of the target object are not implemented as 3D images through learning of 2D images, and only 3D landmarks and 3D joint positions are output. It is not possible to implement unique detailed motion expression of the target object in 3D. Therefore, there is a limitation that it could not be used in a virtual space such as metaverse.

Therefore, in the future, it is necessary to develop an artificial intelligence technology capable of generating a 3D agency that realistically expresses even unique detailed motion features of a target persona through learning of 2D images.

SUMMARY

The present disclosure aims to solve the above problems and other problems.

The present disclosure aims to provide an artificial intelligence device capable of extracting a training dataset including voice information, face information, and motion information corresponding to target persona of a two-dimensional (2D) image, inputting the training dataset to an agency generation model, learning motion features of the target persona, and generating a three-dimensional (3D)

agency that can realistically express even unique detailed motion features of the target persona, and a 3D agency generating method thereof.

An artificial intelligence device according to an embodiment of the present disclosure may include: a memory configured to store training datasets for each target persona; and a processor configured to generate a three-dimensional agency corresponding to the target persona by using the training dataset for each target persona, wherein the processor is configured to: acquire a two-dimensional image including the target persona; pre-process the two-dimensional image to extract a training dataset including voice information, face information, and motion information corresponding to the target persona; input the training dataset to an agency generation model to learn motion features of the target persona; and when user input data for generating the 3D agency is received, by input the user input data to a pre-trained agency generation model to generate a three-dimensional agency expressing the motion features of the target persona.

A three-dimensional agency generating method of an artificial intelligence device according to an embodiment of the present disclosure may include: acquiring a two-dimensional image including a target persona; pre-processing the two-dimensional image to extract a training dataset including voice information, face information, and motion information corresponding to the target persona; inputting the training dataset to an agency generation model to learn motion features of the target persona; confirming whether user input data for generating the three-dimensional agency is received; and when the user input data for generating the three-dimensional agency is received, inputting the user input data to the pre-trained agency generation model to generate the three-dimensional agency expressing the motion features of the target persona.

BRIEF DESCRIPTION OF THE DRAWINGS

FIGS. 12 and 13 are diagrams for describing a predetermined (a.k.a., "special") motion feature information extracting process of the AI device according to an embodiment of the present disclosure.

DETAILED DESCRIPTION OF THE EMBODIMENTS

Figure 1:
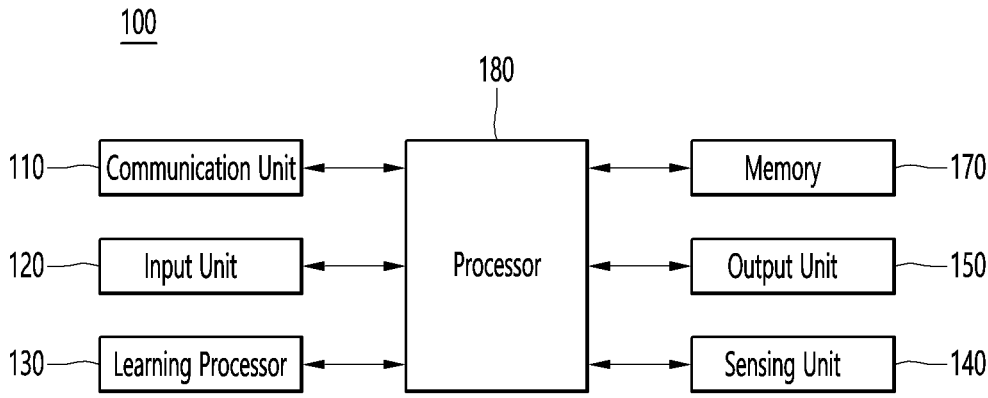
FIG. 1 illustrates an artificial intelligence (AI) device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Also, throughout this specification, a neural network and a network function may be used interchangeably. The neural network may be constituted by a set of interconnected computational units, which may be generally referred to as "nodes". These "nodes" may also be referred to as "neurons". The neural network is configured to include at least two or more nodes. Nodes (or neurons) constituting neural networks may be interconnected by one or more "links".

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of training an artificial neural network in a state in which a label for learning data is given, and the label may mean the correct answer (or result value) that the artificial neural network must infer when the learning data is input to the artificial neural network. The unsupervised learning may refer to a method of training an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)> Extended reality is collectively referred to as virtual reality (VR), augmented reality (AR), and mixed reality (MR).

The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (TIMID), a head-up display (HUD), a mobile phone, a tablet PC, a laptop, a desktop, a TV, a digital signage, and the like. A device to which the XR technology is applied may be referred to as an XR device.

FIG. 1 illustrates an artificial intelligence (AI) device 100 according to an embodiment of the present disclosure.

The AI device (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

Figure 2:
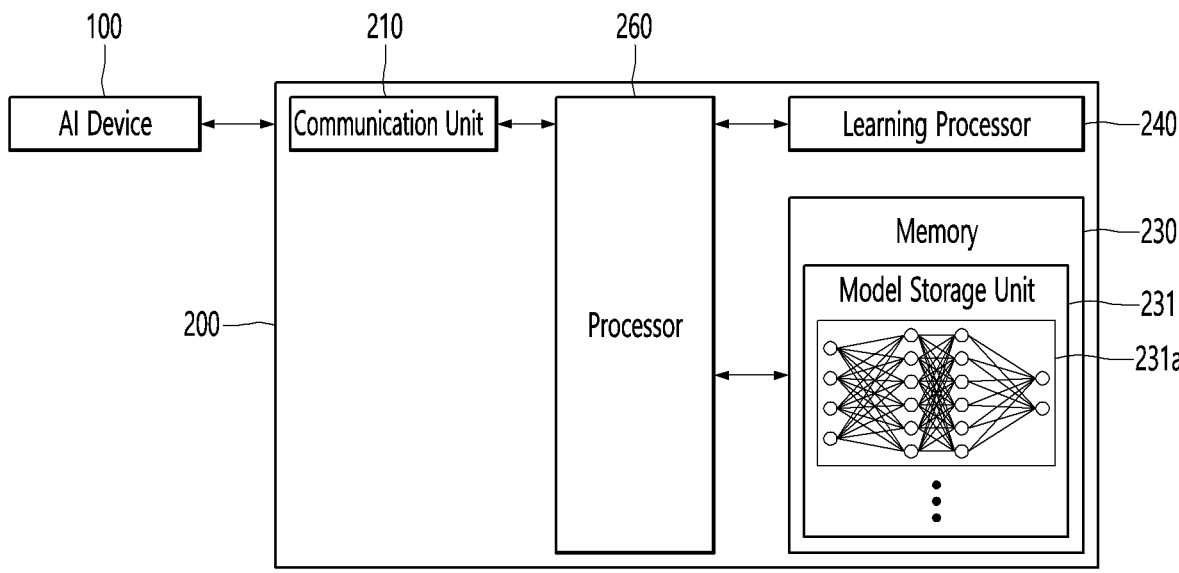
FIG. 2 illustrates an AI server according to an embodiment of the present disclosure.

At this time, the learning processor 130 may perform AI processing together with the learning processor 240 of the AI server 200 of FIG. 2.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in the memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network/The AI server 200 may include a plurality of servers to perform distributed processing or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231*a*) through the learning processor 240.

The learning processor 240 may learn the artificial neural network 231*a* by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
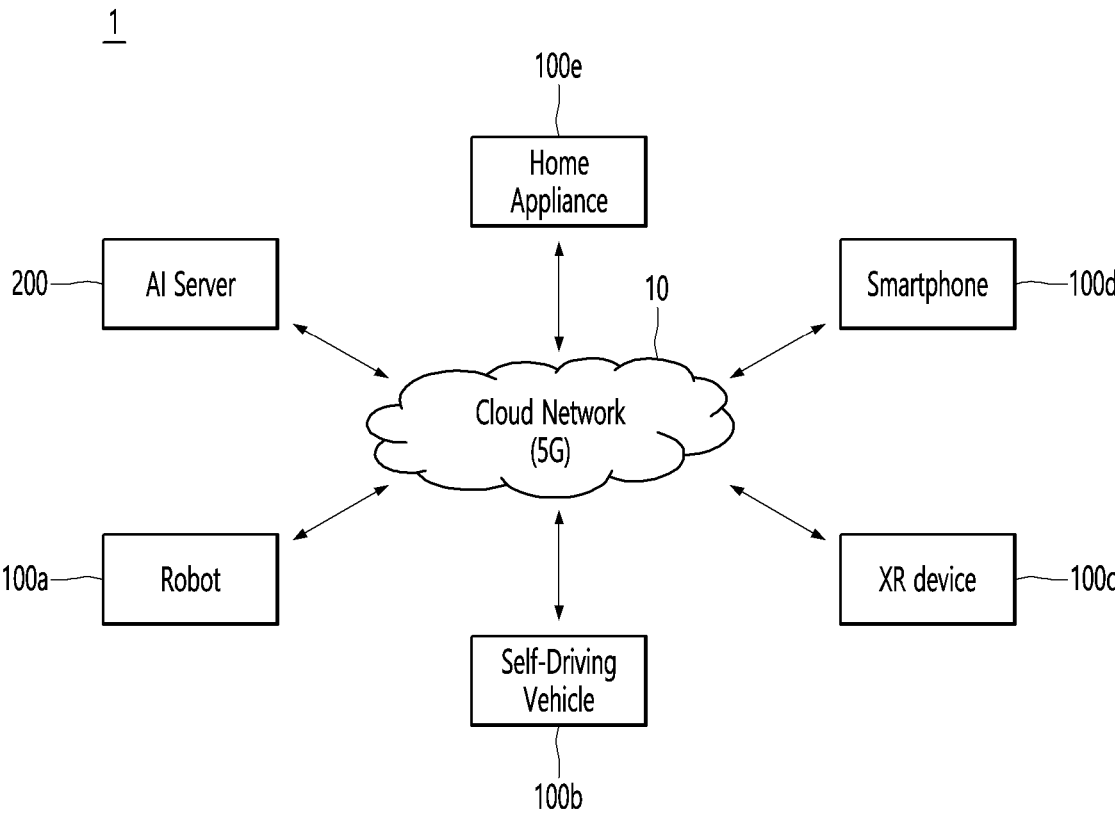
FIG. 3 illustrates an AI system according to an embodiment of the present disclosure.

FIG. 3 is a view of an AI system 1 according to an embodiment of the present invention.

Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the accommodated input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model provided as at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be accommodated to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the path and the travel plan, or may determine the operation.

Like the robot 100a, the self-driving vehicle 100b may use the sensor information acquired from at least one sensor among the lidar, the radar, and the camera so as to determine the travel path and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

In this case, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel path and the travel plan, and may control the driving device such that the self-driving vehicle 100b travels along the determined travel path and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. In this case, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

In this case, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot subjected to control/interaction in an XR image. In this case, the robot 100a may be separated from the XR device 100c and interwork with each other.

If the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user may confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle subjected to control/interaction in an XR image. Particularly, the self-driving vehicle 100b In other words subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

If the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
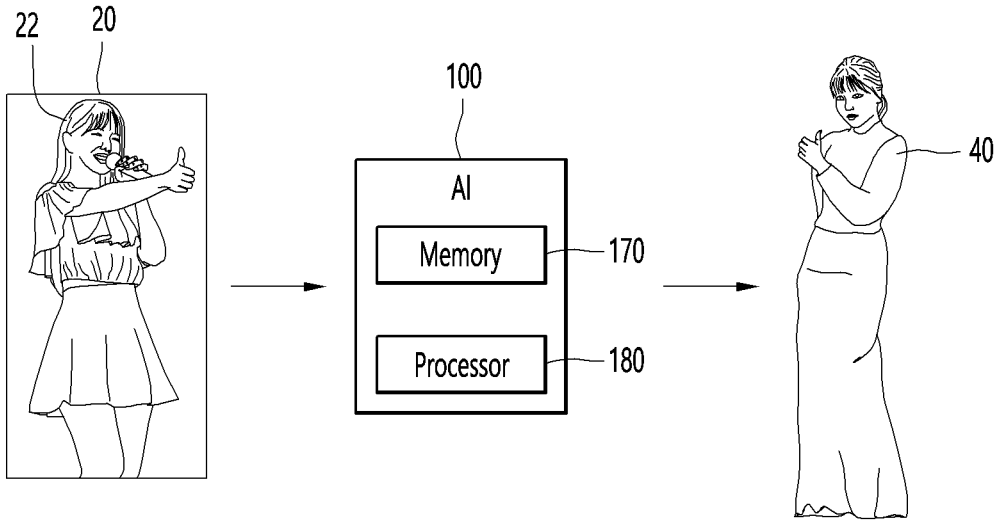
FIG. 4 is a diagram for describing an operation of an AI device according to an embodiment of the present disclosure.

FIG. 4 is a diagram for describing an operation of an AI device according to an embodiment of the present disclosure.

As illustrated in FIG. 4, an AI device 100 of the present disclosure may include a memory 170 that stores a training dataset for each target persona, and a processor 180 that generates a three-dimensional (3D) agency 40 corresponding to a target persona by using the training dataset for each target persona.

The processor 180 may acquire a two-dimensional (2D) image 20 including a target persona 22, may pre-process the 2D image 20 to extract a training dataset including voice information, face information, and motion information corresponding to the target persona 22, may input the training dataset to an agency generation model to train motion characteristics of the target persona 22, and when user input data for the generation of the 3D agency 40 is received, may input the user input data to the pre-trained agency generation model to generate the 3D agency 40 expressing the motion characteristics of the target persona 22.

For example, if a user input of selecting a target persona 22 is received when acquiring the 2D image 20, the processor 180 may acquire basic information of a target person corresponding to the selected target persona 22, and may acquire the 2D image 20 including the target persona 22 selected from at least one of an internal server and an external server, based on the basic information of the target person.

The 2D image 20 acquired from the internal server and the external server may be a moving image including a target person image corresponding to the target persona 22 and his/her voice, but this is only an example, and the present disclosure is not limited thereto.

As another example, if the user input of selecting the target persona 22 is received when acquiring the 2D image 20, the processor 180 may control a camera unit to capture a target person corresponding to the selected target persona, and may acquire the 2D image 20 including the target persona 22 captured by the camera unit.

The 2D image 20 captured by the camera unit may be a moving image including a target person image corresponding to the target persona 22 and his/her voice, but this is only an example, and the present disclosure is not limited thereto.

In this case, the camera unit may include an RGB camera that captures an RGB image of the target person corresponding to the selected target persona, and a depth camera that acquires a 3D point cloud of the target person corresponding to the selected target persona.

In addition, the camera unit may further include a microphone that acquires audio data of the target person corresponding to the selected target persona.

Next, when the 2D image 20 is pre-processed, the processor 180 may confirm whether the pre-selected target persona 22 is included in the acquired 2D image 20. When the target persona 22 is included in the 2D image 20, the processor 180 may assign an identification code to the target persona 22 included in the 2D image 20. The processor 180 may extract a training dataset including voice information, face information, and motion information corresponding to the target persona 22 to which the identification code is assigned. The processor 180 may store the training dataset in the memory 170 for each identification code of the target persona 22.

When extracting the training dataset including the face information, the processor 180 may extract a facial landmark from the face of the target persona 22 included in the 2D image 20, and may input the 2D image 20 and the facial landmark of the target persona 22 to a pre-trained first neural network model and extract face information including face motion data of the target persona 22.

For example, the first neural network model may include a 3D morphable model (3DMM) algorithm, but this is only an example, and the present disclosure is not limited thereto.

In addition, when extracting the training dataset including motion information, the processor 180 may extract 3D keypoints for joint positions from the body of the target persona 22 included in the 2D image 20, and may input the 2D image 20 and the 3D keypoints of the target persona 22 to the pre-trained second neural network model and acquire motion information including 3D rotation parameters of the joints corresponding to the motion of the target persona 22.

For example, the second neural network model may include a 3D rotation model algorithm, but this is only an example, and the present disclosure is not limited thereto.

In addition, when the 3D rotation parameters of the joints are extracted, the processor 180 may analyze the motion degree of each joint based on the 3D rotation parameters, and may extract a motion control reference value with respect to each body part of the target persona 22 for each frame of the 2D image 20.

For example, the motion control reference value may include motion control reference values for a hand position and a motion speed thereof, a head position and a motion speed thereof, a foot position and a motion speed thereof, a neck position and a motion speed thereof, an arm position and a motion speed thereof, a leg position and a motion speed thereof, a waist position and a motion speed thereof among the body parts of the target persona 22, but this is only an example, and the present disclosure is not limited thereto.

The motion control reference value may have different values for each target persona.

For example, the motion control reference value may be different depending on a physical condition of the target persona.

In addition, when extracting the training dataset including voice information, the processor 180 may extract audio data of the target persona 22 included in the 2D image 20, and may input the audio data to a pre-trained third neural network model and extract voice information including a sentence corresponding to the voice of the target persona 22, timing information of words in the sentence, and voice features of the target persona 22.

For example, the third neural network model may include a speech to text (STT) model, a forced alignment model, and a voice model, but this is only an example, and the present disclosure is not limited thereto.

When extracting voice information, the processor 180 may convert the audio data into text to extract a sentence corresponding to the voice of the target persona 22, may extract timing information of words in the sentence extracted from the voice of the target persona 22, and may extract voice features of the target persona 22 from the audio data.

In addition, the processor 180 may extract training dataset including predetermined motion feature information from the target persona 22 included in the 2D image 20, and may store the training dataset including the predetermined motion feature information in the memory 170 for each identification code of the target persona 22.

When extracting the training dataset including the predetermined motion feature information, the processor 180 may select a specific section from the 2D image 20 including the target persona 22, may vectorize face information and motion information extracted from the target persona 22 of the 2D image 20 corresponding to the selected specific section, may analyze the distribution of the vectorized data to confirm whether there is data whose occurrence frequency is equal to or higher than a reference frequency, may determine a corresponding data as the predetermined motion feature when there is the data whose occurrence frequency is equal to or higher than the reference frequency, and may extract predetermined motion feature information based on the face information and the motion information of the specific section corresponding to the data determined as the predetermined motion feature.

For example, the processor 180 may use a key frame extraction algorithm to select a partial section, in which the target persona 22 performs a predetermined motion, as the specific section among the entire sections of the 2D image 20 including the target persona 22.

The processor 180 may recognize at least one of a unique face expression, a unique gesture, and a unique body motion of the target persona 22 as the predetermined motion of the target persona 22.

In some cases, when the specific section is selected from the 2D image 20, the processor 180 may extract the facial landmark from the face of the target persona 22 included in the 2D image 20 corresponding to the selected specific section, may input the facial landmarks of the target persona 22 and the 2D image 20 corresponding to the specific section to the pre-trained first neural network model to extract face information including face motion data of the target persona 22, may extract 3D keypoints for joint positions from the body of the target persona 22 included in the 2D image 20 corresponding to the selected specific section, may input the 2D image 20 corresponding to the specific section and the 3D keypoints of the target persona 22 to the pre-trained second neural network model, and may extract motion information including 3D rotation parameters of joints corresponding to the motion of the target persona 22.

For example, the first neural network model may include a 3DMM algorithm and the second neural network model may include a 3D rotation model algorithm, but this is only an example, and the present disclosure is not limited thereto.

As another case, when the specific section is selected from the 2D image 20, the processor 180 may confirm whether the face information and the motion information extracted from the target persona 22 of the 2D image 20 corresponding to the selected specific section exist in the memory 170. When the face information and the motion information of the target persona 22 corresponding to the specific section exist, the processor 180 may vectorize the face information and the motion information of the target persona 22 corresponding to the specific section.

Next, as an embodiment, when the motion features of the target persona 22 are learned, the processor 180 may input the dataset including identification code, voice information, face information, and motion information corresponding to the target persona 22 to the agency generation model to learn the face motion of the target persona 22 based on the identification code, the voice information, and the face information, and may learn 3D rotation parameters of joints corresponding to the target persona 22 based on the identification code, the voice information, and the motion information.

The processor 180 may identify the target persona 22 by using the identification code when learning the face motion of the target persona 22, and may learn the face motion of the target persona 22 so as to be synchronized with the voice timing of the target persona 22, based on voice information including a sentence corresponding to the voice of the target persona 22, timing information of words in the sentence, and voice features of the target persona 22, and face information including face motion data of the target persona 22.

The processor 180 may identify the target persona 22 by using the identification code when learning the 3D rotation parameters of the joints corresponding to the target persona 22, and may learn 3D rotation parameters of joints corresponding to the target persona 22 so as to be synchronized with the voice timing of the target persona 22, based on voice information including a sentence corresponding to the voice of the target persona 22, timing information of words in the sentence, and voice features of the target persona 22, and motion information including 3D rotation parameters of joints corresponding to the motion of the target persona 22 and motion control reference values for each body part of the target persona 22.

The agency generation model may include a face motion model that learns the face motion of the target persona based on the identification code, the voice information, and the face information, and a body motion model that learns 3D rotation parameters of joints corresponding to the target persona based on the identification code, the voice information, and the motion information.

As another example, when learning the motion features of the target persona 22, the processor 180 may input the dataset including the identification code, the voice information, the face information, the motion information, and the text information corresponding to the target persona 22 to the agency generation model to learn the voice of the target persona 22 based on the identification code and the text information, may learn the face motion of the target persona 22 based on the identification code, the voice information, and the face information, and may learn 3D rotation parameters of joints corresponding to the target persona 22 based on the identification code, the voice information, and the motion information.

When learning the voice of the target persona 22, the processor 180 may identify the target persona 22 by using the identification code, may convert the text information into audio data, and may learn the voice of the target persona 22.

The processor 180 may identify the target persona 22 by using the identification code when learning the face motion of the target persona 22, and may learn the face motion of the target persona 22 so as to be synchronized with the voice timing of the target persona 22, based on voice information including a sentence corresponding to the voice of the target persona 22, timing information of words in the sentence, and voice features of the target persona 22, and face information including face motion data of the target persona 22.

The processor 180 may identify the target persona 22 by using the identification code when learning the 3D rotation parameters of the joints corresponding to the target persona 22, and may learn 3D rotation parameters of joints corresponding to the target persona 22 so as to be synchronized with the voice timing of the target persona 22, based on voice information including a sentence corresponding to the voice of the target persona 22, timing information of words in the sentence, and voice features of the target persona 22, and motion information including 3D rotation parameters of joints corresponding to the motion of the target persona 22 and motion control reference values for each body part of the target persona 22.

The agency generation model may include a TTS model that learns the voice of the target persona based on the identification code and the text information, a face motion model that learns the face motion of the target persona based on the identification code, the voice information, and the face information, and a body motion model that learns 3D rotation parameters of joints corresponding to the target persona based on the identification code, the voice information, and the motion information.

As another example, when learning the motion features of the target persona 22, the processor 180 may input the dataset including the identification code, the voice information, the face information, the motion information, the text information, and predetermined motion feature information corresponding to the target persona 22 to the agency generation model to learn the voice of the target persona 22 based on the identification code and the text information, may learn the face motion of the target persona 22 based on the identification code, the voice information, and the face information, may learn 3D rotation parameters of joints corresponding to the target persona 22 based on the identification code, the voice information, and the motion information, and may learn unique specific motion of the target persona 22 based on the identification code and the predetermined motion feature information.

When learning the voice of the target persona 22, the processor 180 may identify the target persona 22 by using the identification code, may convert the text information into audio data, and may learn the voice of the target persona 22.

The processor 180 may identify the target persona 22 by using the identification code when learning the face motion of the target persona 22, and may learn the face motion of the target persona 22 so as to be synchronized with the voice timing of the target persona 22, based on voice information including a sentence corresponding to the voice of the target persona 22, timing information of words in the sentence, and voice features of the target persona 22, and face information including face motion data of the target persona 22.

The processor 180 may identify the target persona 22 by using the identification code when learning the 3D rotation parameters of the joints corresponding to the target persona 22, and may learn 3D rotation parameters of joints corresponding to the target persona 22 so as to be synchronized with the voice timing of the target persona 22, based on voice information including a sentence corresponding to the voice of the target persona 22, timing information of words in the sentence, and voice features of the target persona 22, and motion information including 3D rotation parameters of joints corresponding to the motion of the target persona 22 and motion control reference values for each body part of the target persona 22.

In addition, the processor 180 may use the identification code to identify the target persona 22 when learning a unique specific motion of the target persona 22, and may learn the unique specific motion of the target persona 22 by controlling a weight so that the weight is lowered for a specific motion having a negative meaning and is increased for a specific motion having a positive meaning, based on the predetermined motion feature information of the target persona 22.

The agency generation model may include a TTS model that learns the voice of the target persona based on the identification code and the text information, a face motion model that learns the face motion of the target persona based on the identification code, the voice information, and the face information, a body motion model that learns 3D rotation parameters of joints corresponding to the target persona based on the identification code, the voice information, and the motion information, and a predetermined motion feature model that learns a unique specific motion of the target persona based on the identification code and the predetermined motion feature information.

Next, as an embodiment, when generating the 3D agency 40, the processor 180 may confirm whether user input data includes identification code, audio-related basic data, and motion control level if user input data for generation of the 3D agency is received, may input the user input data including the identification code, the audio-related basic data, and the motion control level to the pre-trained agency generation model to output the voice, face motion, and body motion of the target persona, and may generate the 3D agency 40 expressing user-specific general voice features and unique motion features of the target persona based on the voice, face motion, and body motion.

The audio-related basic data may include a normal voice that the user intends to apply to the 3D agency, a sentence corresponding to the normal voice, and timing information required for synchronizing the normal voice and the sentence.

In addition, if the motion control level is not included in the user input data, the processor 180 may input motion control reference values for each body part of the target persona pre-stored in the memory 170 to the agency generation model.

In addition, when the normal voice that the user intends to apply to the 3D agency is included in the audio-related basic data, the processor 180 may generate the 3D agency 40 expressing normal voice features that the user intends to apply instead of the voice features of the target persona.

In addition, when the user input of requesting a target persona list is received before the user input data for generation of the 3D agency is received, the processor 180 may provide a target persona list table including a representative name corresponding to the target persona pre-stored in the memory and identification code thereof, and when the user input of selecting a predetermined target persona from the target persona list table is received, may acquire the identification code of the selected target persona and may recognize the acquired identification code as user input data for generation of the 3D agency.

The target persona list table may further include a representative image corresponding to target persona pre-stored in the memory 170.

As an embodiment, when generating the 3D agency 40, the processor 180 may confirm whether user input data includes identification code, text, and motion control level if user input data for generation of the 3D agency is received, may input the user input data including the identification code, the text, and the motion control level to the pre-trained agency generation model to output the voice, face motion, and body motion of the target persona, and may generate the 3D agency 40 expressing the unique motion features of the target persona and unique voice features based on the voice, face motion, and body motion.

If the motion control level is not included in the user input data, the processor 180 may input motion control reference values for each body part of the target persona pre-stored in the memory 170 to the agency generation model.

In addition, when the text is included in the user input data, the processor 180 may generate the 3D agency 40 expressing the contents of the text as unique voice features of the target persona.

In addition, when the user input of requesting a target persona list is received before the user input data for generation of the 3D agency is received, the processor 180 may provide a target persona list table including a representative name corresponding to the target persona pre-stored in the memory 170 and identification code thereof, and when the user input of selecting a predetermined target persona from the target persona list table is received, may acquire the identification code of the selected target persona and may recognize the acquired identification code as user input data for generation of the 3D agency.

The target persona list table may further include a representative image corresponding to target persona pre-stored in the memory 170.

As described above, in the present disclosure, it is possible to extract the training dataset including the voice information, the face information, and the motion information corresponding to the target persona of the 2D image, to input the training dataset to the agency generation model, to learn the motion features of the target persona, and to generate the 3D agency that can realistically express even the unique detailed motion features of the target persona.

In addition, in the present disclosure, it is possible to extract unique and predetermined motion feature information for each target persona, to learn a unique specific motion of the target persona, and to generate a 3D agency expressing the unique specific motion of the target persona, thereby providing fun and interest to customers.

In addition, in the present disclosure, it is possible to learn the actual voice of the target persona or the voice that the user intends to apply, and to generate a 3D agency expressing not only the unique voice of the target persona but also the applied voice of the user, thereby providing a variety of services to customers.

Figure 5:
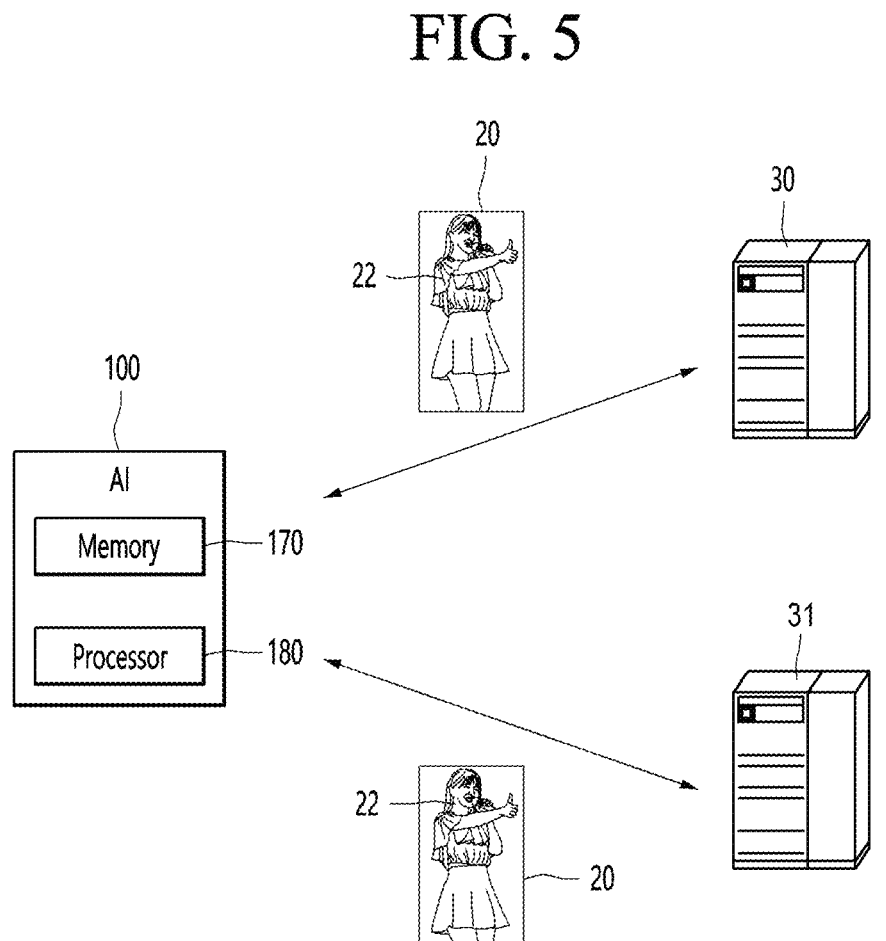
FIGS. 5 and 6 are diagrams for describing a two-dimensional (2D) image acquiring process of the AI device according to an embodiment of the present disclosure.
Figure 6:
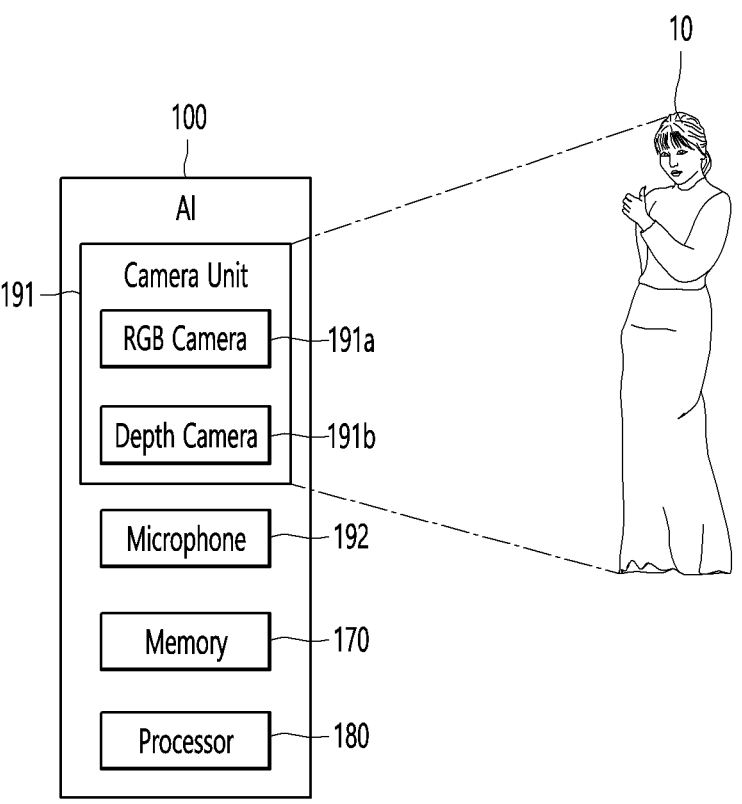

FIGS. 5 and 6 are diagrams for describing the 2D image acquiring process of the AI device according to an embodiment of the present disclosure.

In the present disclosure, the 2D image 20 including target persona 22 may be acquired, and the 3D agency expressing the motion features of the target persona 22 may be generated through the learning of the 2D image 20.

As illustrated in FIG. 5, if the user input of selecting the target persona 22 is received when acquiring the 2D image 20, the AI device 100 of the present disclosure may acquire basic information of the target person corresponding to the selected target persona 22, and may acquire the 2D image 20 including the target persona 22 selected from at least one of an internal server 31 and an external server 30, based on the basic information of the target person.

The target persona may include various characters such as a general celebrity, a famous influencer, a specially created virtual character, and a general target person.

In addition, the 2D image 20 including the target persona 22 may be acquired from various data images distributed by online media and public institutions.

For example, the 2D image 20 acquired from the internal server 31 and the external server 30 may be a moving image including a target person image corresponding to the target persona 22 and his/her voice, but this is only an example, and the present disclosure is not limited thereto.

As illustrated in FIG. 6, if the user input of selecting the target persona 22 is received when acquiring the 2D image 20, the AI device 100 of the present disclosure may control the camera unit 191 to capture the target person 10 corresponding to the selected target persona, and may acquire the 2D image 20 including the target persona 22 captured by the camera unit 191.

The 2D image 20 captured by the camera unit 191 may be a moving image including a target person image corresponding to the target persona 22 and his/her voice, but this is only an example, and the present disclosure is not limited thereto.

In this case, the camera unit 191 may include an RGB camera 191*a* that captures an RGB image of the target person corresponding to the selected target persona, and a depth camera 191*b* that acquires a 3D point cloud of the target person corresponding to the selected target persona.

In addition, the AI device 100 may further include a microphone 192 that acquires audio data of the target person corresponding to the selected target persona.

For example, the target persona 10 corresponding to the target persona may include various characters such as a general celebrity, a famous influencer, a specially created virtual character, and a general target person.

Figure 7:
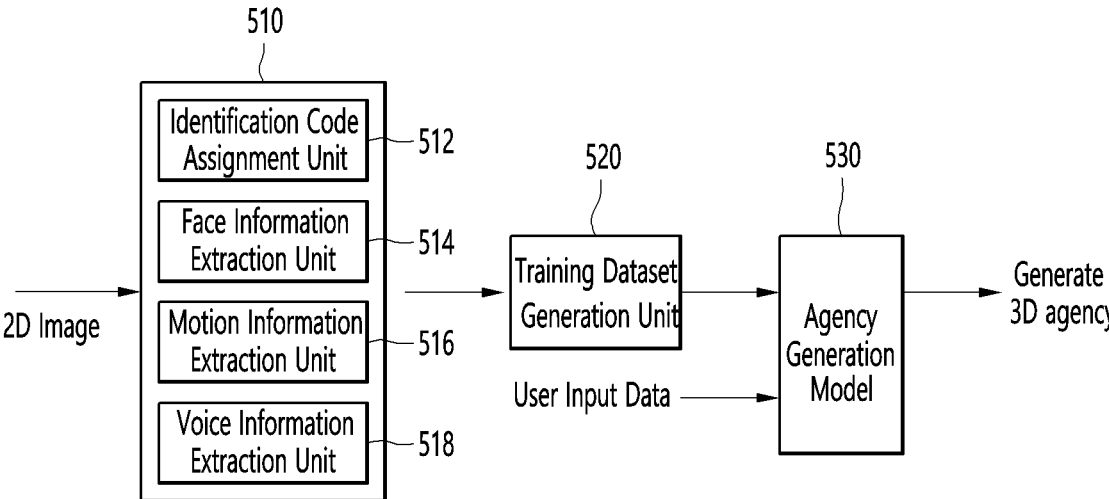
FIG. 7 is a diagram for describing a processor of the AI device according to an embodiment of the present disclosure.

FIG. 7 is a diagram for describing the processor of the AI device according to an embodiment of the present disclosure.

As illustrated in FIG. 7, the processor of the present disclosure may include a pre-processing unit 510 that pre-processes a 2D image, a training dataset generation unit 520 that generates training dataset, and an agency generation model 530 that generates a 3D agency Here, the pre-processing unit 510 may include an identification code assignment unit 512 that assigns an identification code to the target persona included in the 2D image, a face information extraction unit 514 that extracts face information corresponding to the target persona to which the identification code is assigned, a motion information extraction unit 516 that extracts motion information corresponding to the target persona to which the identification code is assigned, and a voice information extraction unit 518 that extracts voice information corresponding to the target persona to which the identification code is assigned.

The pre-processing unit 510 may confirm whether the pre-selected target persona is included in the 2D image. When the target persona is included in the 2D image, the pre-processing unit 510 may assign the identification code to the target persona included in the 2D image. The pre-processing unit 510 may extract voice information, face information, and motion information corresponding to the target persona to which the identification code is assigned.

Next, the training dataset generation unit 520 may generate the training dataset including the voice information, the face information, and the motion information corresponding to the target persona.

The training dataset generation unit 520 may store the training dataset in the memory for each identification code of the target persona.

When the dataset including the identification code, the voice information, the face information, and the motion information corresponding to the target persona is input, the agency generation model 530 may learn the face motion of the target persona based on the identification code, the voice information, and the face information, and may acquire the 3D rotation parameters of joints corresponding to the target persona based on the identification code, the voice information, and the motion information.

In some cases, when the dataset including the identification code, the voice information, the face information, the motion information, and the text information corresponding to the target persona is input, the agency generation model 530 may learn the voice of the target persona based on the identification code and the text information, may learn the face motion of the target persona based on the identification code, the voice information, and the face information, and learn the 3D rotation parameters of joints corresponding to the target persona based on the identification code, the voice information, and the motion information.

When the dataset including the identification code, the voice information, the face information, the motion information, the text information, and the predetermined motion feature information corresponding to the target persona is input, the agency generation model 530 may learn the voice of the target persona based on the identification code and the text information, may learn the face motion of the target persona based on the identification code, the voice information, and the face information, may learn the 3D rotation parameters of joints corresponding to the target persona based on the identification code, the voice information, and the motion information, and may learn the unique specific motion of the target persona based on the identification code and the predetermined motion feature information.

Next, when user input data including the identification code, the audio-related basic data, and the motion control level is input, the pre-trained agency generation model 530 may output the voice, face motion, and body motion of the target persona, and may generate the 3D agency 40 expressing the user-specific general voice features and the unique motion features of the target persona based on the voice, face motion, and body motion.

The audio-related basic data may include a normal voice that the user intends to apply to the 3D agency, a sentence corresponding to the normal voice, and timing information required for synchronizing the normal voice and the sentence.

If the motion control level is not included in the user input data, the pre-trained agency generation model 530 may input motion control reference values for each body part of the target persona pre-stored in the memory to the agency generation model.

That is, when the normal voice that the user intends to apply to the 3D agency is included in the audio-related basic data, the pre-trained agency generation model 530 may generate the 3D agency expressing normal voice features that the user intends to apply instead of the voice features of the target persona.

In some cases, when user input data including the identification code, the text, and the motion control level is input, the pre-trained agency generation model 530 may output the voice, face motion, and body motion of the target persona, and may generate the 3D agency expressing the user-specific general voice features and the unique motion features of the target persona based on the voice, face motion, and body motion.

If the motion control level is not included in the user input data, the pre-trained agency generation model 530 may input motion control reference values for each body part of the target persona pre-stored in the memory to the agency generation model.

That is, when the text is included in the user input data, the pre-trained agency generation model 530 may generate the 3D agency expressing the contents of the text as unique voice features of the target persona.

Figure 8:
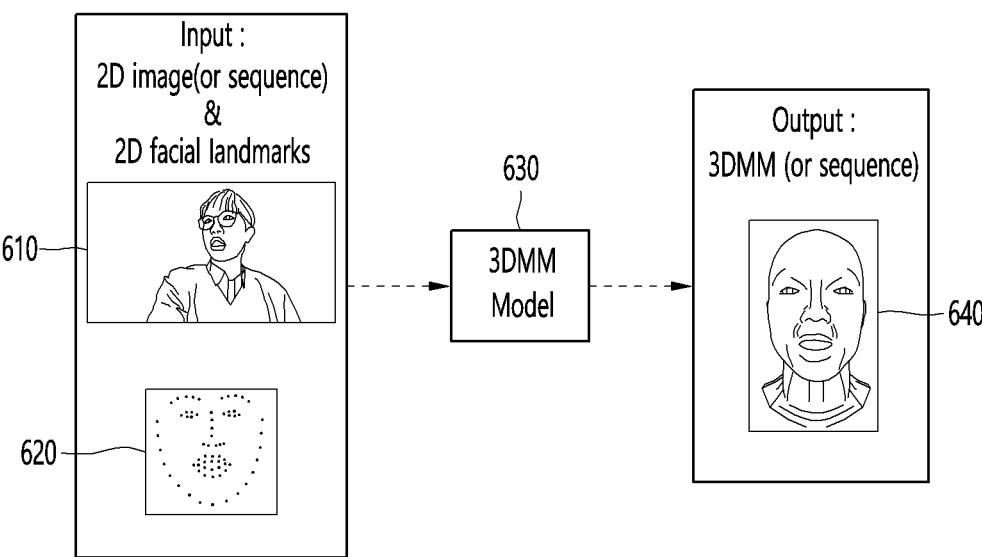
FIG. 8 is a diagram for describing a face information extraction process of the AI device according to an embodiment of the present disclosure.

FIG. 8 is a diagram for describing the face information extraction process of the AI device according to an embodiment of the present disclosure.

As illustrated in FIG. 8, in the present disclosure, the facial landmark may be extracted from the face of the target persona included in the 2D image, the 2D image 610 and the facial landmark 620 of the target persona may be input to the pre-trained first neural network model 630, and face information 640 including face motion data of the target persona may be extracted.

For example, the first neural network model 630 may include a 3DMM algorithm, but this is only an example, and the present disclosure is not limited thereto.

The first neural network model 630 may define face motions such as eye blinking, eyebrow raising, mouth opening, etc., and may express the face in 3D by controlling the value of the motion degree for each defined part in the range of 0 to 1.0.

As described above, in the present disclosure, it is possible to acquire the 2D image and the 3D point cloud, to extract the facial landmarks from the face of the 2D image by using an algorithm for finding landmarks, to synchronize the 2D image and 3D mesh data to extract the 3D landmark of the 3D mesh, and to set only the filtering part of the 3D point cloud to correct the wrong position of the 3D landmark through correction logic.

In the present disclosure, a fitting process of extracting the closest value by comparing the 3D mesh and 3D landmark values generated by transforming the face combination model (3DMM) values used in the graphic engine with the actual 3D point cloud and 3D landmarks may be performed, and after learning, face information may be extracted with the face combination model (3DMM) through the input of the 2D image and 2D landmark.

When the motion of the face is expressed with a value in the range of 0 to 1.0, the face combination model (3DMM) may express a state of closed eyes if the value for the eyelid is set to 0.0, and may express a state of wide eyed if the value for the eyelid is set to 1.0.

Figure 9:
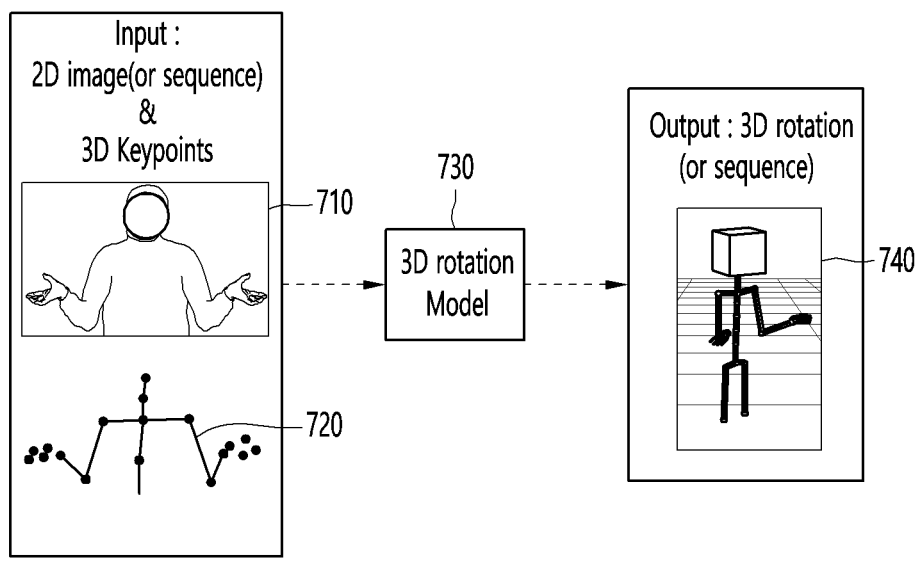
FIG. 9 is a diagram for describing a motion information extracting process of the AI device according to an embodiment of the present disclosure.

FIG. 9 is a diagram for describing the motion information extracting process of the AI device according to an embodiment of the present disclosure.

As illustrated in FIG. 9, in the present disclosure, 3D keypoints for joint positions may be extracted from the body of the target persona included in the 2D image, and a 2D image 710 and the 3D keypoint 720 of the target persona may be input to a pre-trained second neural network model 730 to extract motion information 740 including 3D rotation parameters of joints corresponding to the motions of the target persona.

For example, the second neural network model 730 may include a 3D rotation model algorithm, but this is only an example, and the present disclosure is not limited thereto.

In addition, in the present disclosure, when the 3D rotation parameters of the joints are extracted, the motion degree of each joint may be analyzed based on the 3D rotation parameters, and a motion control reference value may be extracted with respect to each body part of the target persona for each frame of the 2D image.

For example, the motion control reference value may include motion control reference values for a hand position and a motion speed thereof, a head position and a motion speed thereof, a foot position and a motion speed thereof, a neck position and a motion speed thereof, an arm position and a motion speed thereof, a leg position and a motion speed thereof, a waist position and a motion speed thereof among the body parts of the target persona, but this is only an example, and the present disclosure is not limited thereto.

The motion control reference value may have different values for each target persona.

For example, the motion control reference value may be different depending on a physical condition of the target persona.

As described above, in the present disclosure, the 3D rotation parameters of the joints may be extracted, the 2D image and the joint 3D rotation parameters may be synchronized through a predetermined motion, the keypoints may be extracted by using an algorithm for finding keypoints in a 2D image, and the 3D rotation parameters of the corresponding part and joints may be mapped.

In the present disclosure, it is possible to perform learning to extract the 3D rotation parameters of the joints corresponding to each 3D keypoint through the input of the 2D image and the 3D keypoint.

The keypoint is a location having a specific meaning in the 2D image, and may be a central point of a joint.

Next, the 3D rotation parameter may be a parameter expressing the rotation of the joint with a rotation matrix, Euler angle X/Y/Z values, and the like.

For example, in a 3D space, the rotation may be defined with three Euler values. In addition to the Euler angles, the rotation may be defined in various 3D rotation expression methods such as rotation matrix and 6D rotation parameters.

Figure 10:
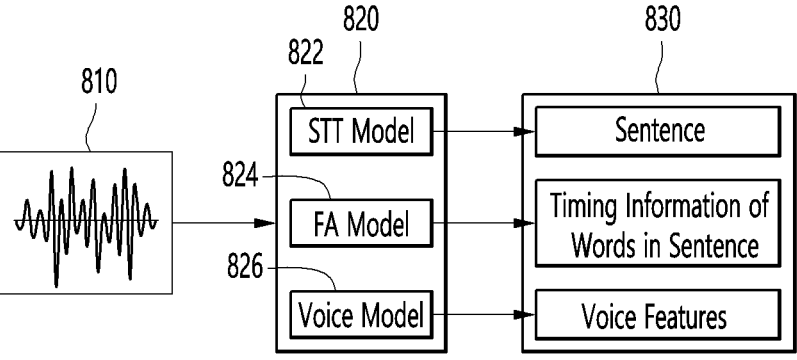
FIG. 10 is a diagram for describing a voice information extracting process of the AI device according to an embodiment of the present disclosure.

FIG. 10 is a diagram for describing the voice information extracting process of the AI device according to an embodiment of the present disclosure.

As illustrated in FIG. 10, in the present disclosure, audio data 810 of the target persona included in the 2D image may be extracted, and the audio data may be input to a pre-trained third neural network model 820 to extract voice information 830 including a sentence corresponding to the voice of the target persona, timing information of words in the sentence, and voice features of the target persona.

For example, the third neural network model 830 may include an STT model 822, a forced alignment model 824, and a voice model 826, but this is only an example, and the present disclosure is not limited thereto.

In the present disclosure, the audio data 810 may be converted into text through the STT model 822 to extract a sentence corresponding to the voice of the target persona, timing information of words in the sentence extracted from the voice of the target persona may be extracted through a post-alignment model 824; and voice features of the target persona may be extracted from the audio data through a voice model 826.

Figure 11:
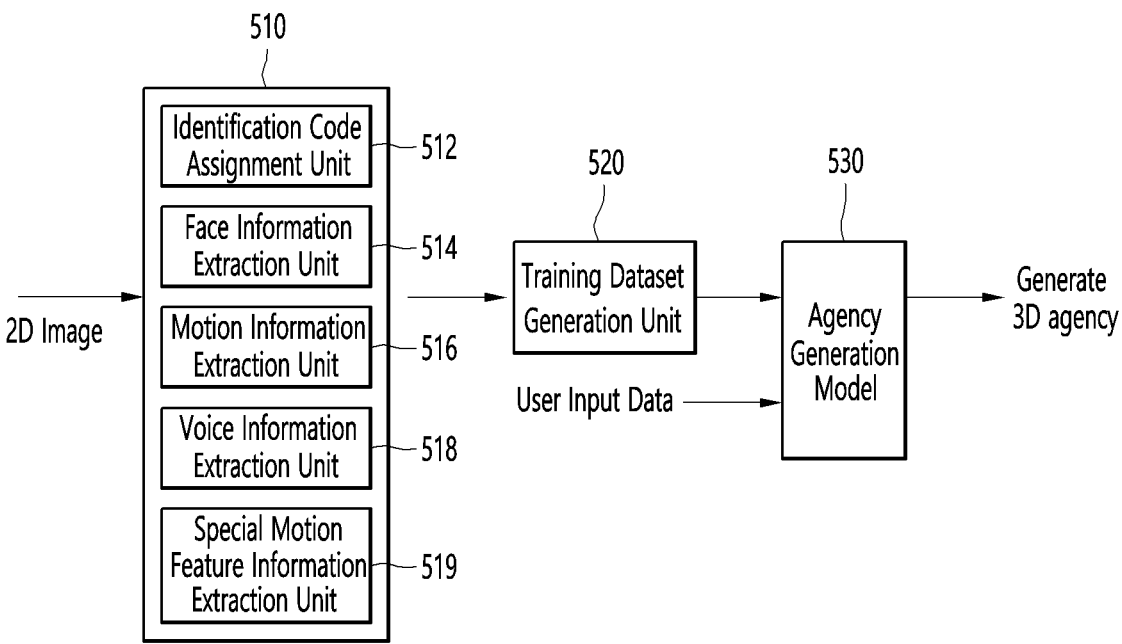
FIG. 11 is a diagram for describing a processor of an AI device according to another embodiment of the present disclosure.

FIG. 11 is a diagram for describing a processor of an AI device according to another embodiment of the present disclosure.

As illustrated in FIG. 11, the processor of the present disclosure may include a pre-processing unit 510 that pre-processes a 2D image, a training dataset generation unit 520 that generates training dataset, and an agency generation model 530 that generates a 3D agency The pre-processing unit 510 may include an identification code assignment unit 512 that assigns an identification code to the target persona included in the 2D image, a face information extraction unit 514 that extracts face information corresponding to the target persona to which the identification code is assigned, a motion information extraction unit 516 that extracts motion information corresponding to the target persona to which the identification code is assigned, a voice information extraction unit 518 that extracts voice information corresponding to the target persona to which the identification code is assigned, and a special motion feature information extraction unit 519 that extracts special motion feature information from the target persona included in the 2D image.

The pre-processing unit 510 may confirm whether the pre-selected target persona is included in the 2D image. When the target persona is included in the 2D image, the pre-processing unit 510 may assign the identification code to the target persona included in the 2D image. The pre-processing unit 510 may extract voice information, face information, motion information, and predetermined motion feature information corresponding to the target persona to which the identification code is assigned.

Next, the training dataset generation unit 520 may generate the training dataset including the voice information, the face information, the motion information, and the predetermined motion feature information corresponding to the target persona.

The training dataset generation unit 520 may store the training dataset in the memory for each identification code of the target persona.

Next, when the dataset including the identification code, the voice information, the face information, the motion information, the text information, and the predetermined motion feature information corresponding to the target persona is input, the agency generation model 530 may learn the voice of the target persona based on the identification code and the text information, may learn the face motion of the target persona based on the identification code, the voice information, and the face information, may learn the 3D rotation parameters of joints corresponding to the target persona based on the identification code, the voice information, and the motion information, and may learn the unique specific motion of the target persona based on the identification code and the predetermined motion feature information.

Next, when user input data including the identification code, the text, and the motion control level is input, the pre-trained agency generation model 530 may output the voice, face motion, and body motion of the target persona, and may generate the 3D agency expressing the user-specific general voice features and the unique motion features of the target persona based on the voice, face motion, and body motion.

If the motion control level is not included in the user input data, the pre-trained agency generation model 530 may input motion control reference values for each body part of the target persona pre-stored in the memory to the agency generation model.

That is, when the text is included in the user input data, the pre-trained agency generation model 530 may generate the 3D agency expressing the contents of the text as unique voice features of the target persona.

Figure 12:
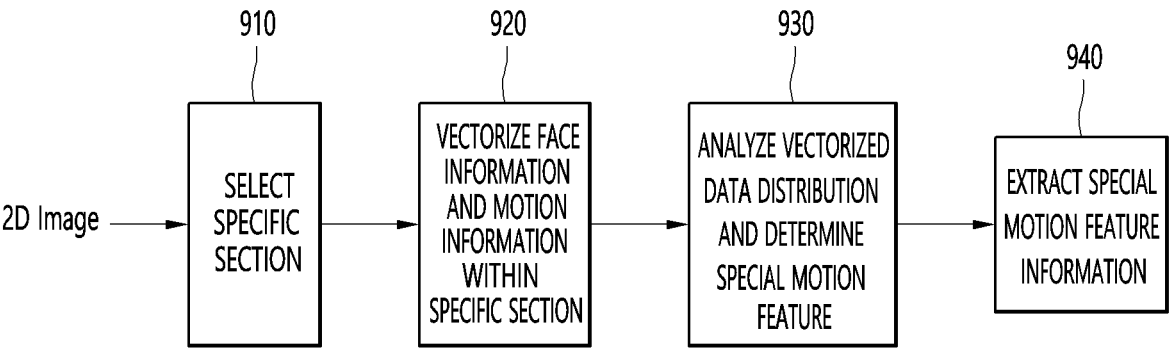
Figure 13:
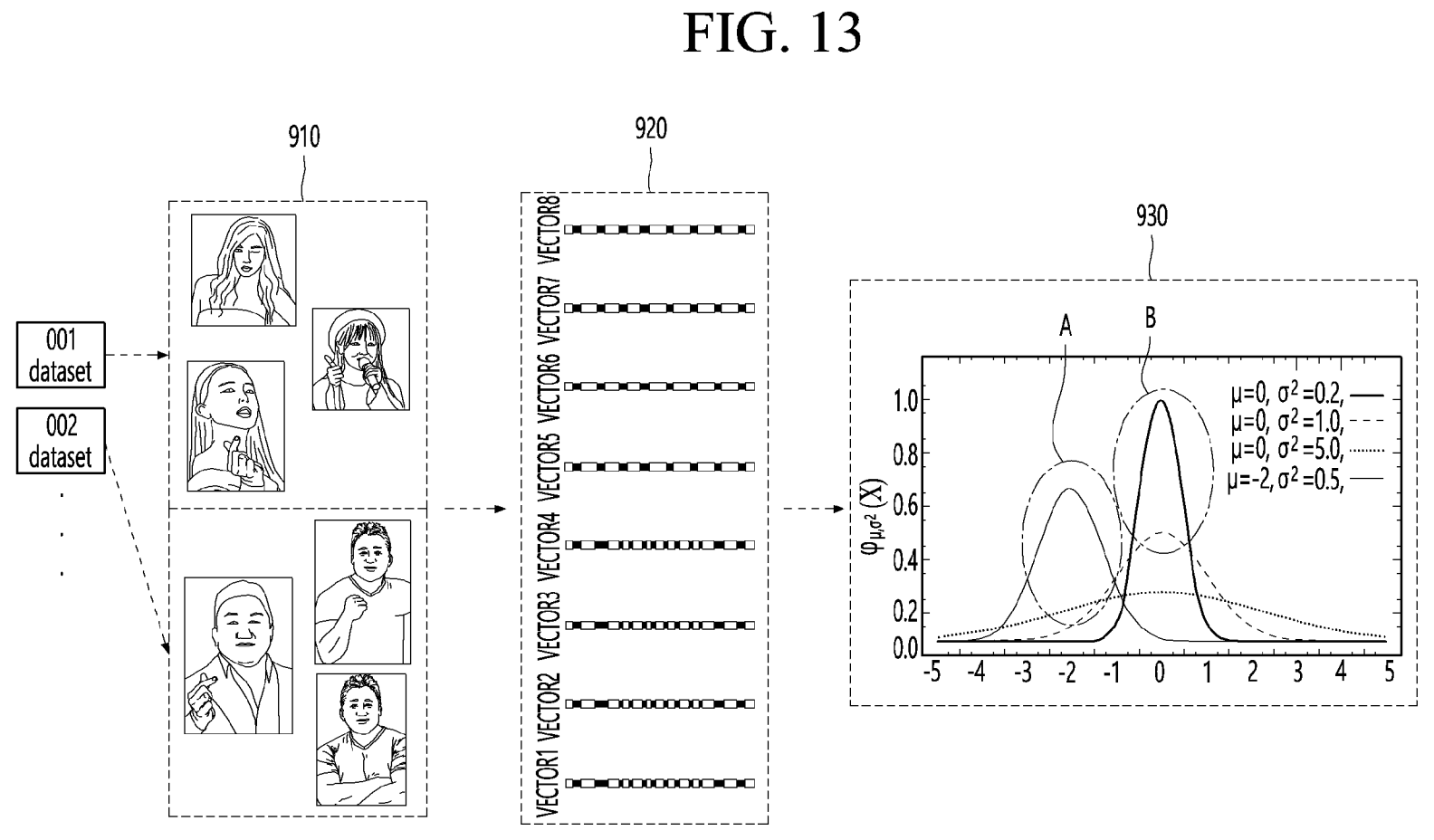

FIGS. 12 and 13 are diagrams for describing the predetermined motion feature information extracting process of the AI device according to an embodiment of the present disclosure.

As illustrated in FIGS. 12 and 13, in the present disclosure, a training dataset including predetermined motion feature information may be extracted from the target persona included in the 2D image, and the training dataset including the predetermined motion feature information may be stored in the memory for each identification code of the target persona.

In the present disclosure, a specific section may be selected from the 2D image including the target persona (910).

For example, in the present disclosure, when selecting the specific section, a partial section in which the target persona performs a predetermined motion may be selected as the specific section among the entire sections of the 2D image including the target persona by using a keyframe extraction algorithm.

In the present disclosure, at least one of a unique face expression, a unique gesture, and a unique body motion of the target persona may be recognized as the predetermined motion of the target persona.

Next, in the present disclosure, face information and motion information extracted from the target persona of the 2D image corresponding to the selected specific section may be vectorized (920).

Next, in the present disclosure, the distribution of the vectorized data may be analyzed to confirm whether there is data whose occurrence frequency is equal to or higher than a reference frequency. When there is the data whose occurrence frequency is equal to or higher than the reference frequency, the corresponding data may be determined as a special motion feature information (930).

As illustrated in FIG. 13, as an example, in the present disclosure, in the case of the first target persona A corresponding to the dataset having an identification code of 001, when the occurrence frequency of a hand motion to raise thumb is equal to or higher than the reference frequency, the hand motion to raise thumb may be determined as a predetermined motion feature of the first target persona.

As another example, in the present disclosure, in the case of the second target persona B corresponding to the dataset having an identification code of 002, when the occurrence frequency of a hand motion to clench a fist is equal to or greater than the reference frequency, the motion of the hand to clench a fist may be determined as a predetermined motion feature of the second target persona.

Next, in the present disclosure, predetermined motion feature information may be extracted based on face information and motion information of the specific section corresponding to the data determined as the special motion information (940).

In some cases, when the specific section is selected from the 2D image, a facial landmark may be extracted from the face of the target persona included in the 2D image corresponding to the selected specific section. Facial landmarks of the target persona and the 2D image corresponding to the specific section may be input to the pre-trained first neural network model to extract face information including face motion data of the target persona. 3D keypoints for joint positions may be extracted from the body of the target persona included in the 2D image corresponding to the selected specific section. The 2D image corresponding to the specific section and the 3D keypoints of the target persona may be input to the pre-trained second neural network model to extract motion information including 3D rotation parameters of joints corresponding to the motion of the target persona.

As another case, in the present disclosure, when the specific section is selected from the 2D image, it may be confirmed whether the face information and the motion information extracted from the target persona of the 2D image corresponding to the selected specific section exist in the memory. When the face information and the motion information of the target persona corresponding to the specific section exist, the face information and the motion information of the target persona corresponding to the specific section may be vectorized.

Figure 14:
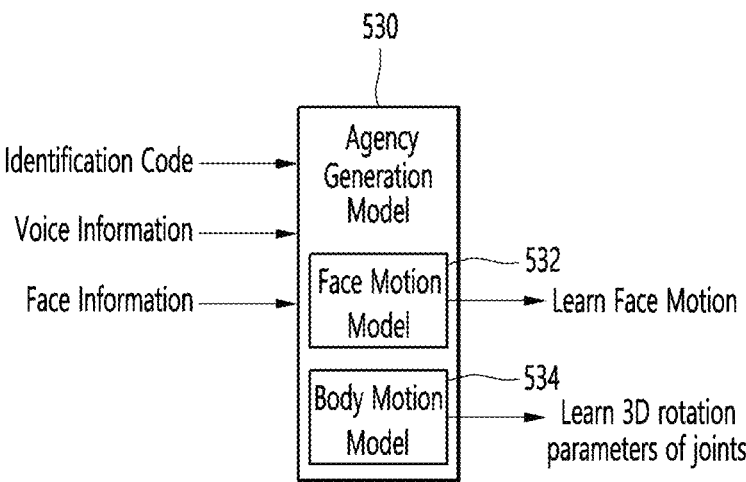
FIG. 14 is a diagram for describing an agency generation model of the AI device according to an embodiment of the present disclosure.

FIG. 14 is a diagram for describing the agency generation model of the AI device according to an embodiment of the present disclosure.

As illustrated in FIG. 14, in the present disclosure, the dataset including identification code, voice information, face information, and motion information corresponding to the target persona may be input to the agency creation model 530, and the face motion of the target persona and the 3D rotation parameters of joints corresponding to the target persona may be learned.

The agency generation model 530 may include a face motion model 532 that learns the face motion of the target persona based on the identification code, the voice information, and the face information, and a body motion model 534 that learns 3D rotation parameters of joints corresponding to the target persona based on the identification code, the voice information, and the motion information.

The face motion model 532 of the agency generation model 530 may identify the target persona by using the identification code, and may learn the face motion of the target persona so as to be synchronized with the voice timing of the target persona based on a sentence corresponding to the voice of the target persona, timing information of words in the sentence, voice information including voice features of the target persona, and face information including face motion data of the target persona.

The body motion model 534 of the agency generation model 530 may identify the target persona by using the identification code, and may learn 3D rotation parameters of joints corresponding to the target persona so as to be synchronized with the voice timing of the target persona based on a sentence corresponding to the voice of the target persona, timing information of words within the sentences, voice information including voice features of the target persona, and motion information including 3D rotation parameters of joints corresponding to the motion of the target persona and motion control reference values for each body part of the target persona.

Figure 15:
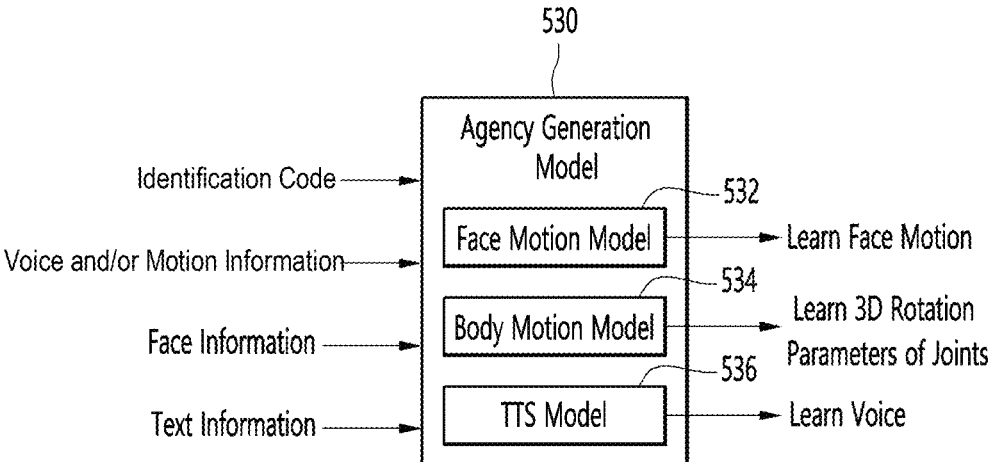
FIG. 15 is a diagram for describing an agency generation model of the AI device according to another embodiment of the present disclosure.

FIG. 15 is a diagram for describing an agency generation model of the AI device according to another embodiment of the present disclosure.

As illustrated in FIG. 15, in the present disclosure, the dataset including identification code, voice information, face information, motion information, and text information corresponding to the target persona may be input to the agency creation model 530, and the voice of the target persona may be learned based on the identification code and the text information. The face motion of the target persona may be learned based on the identification code, the voice information, and the face information. The 3D rotation parameters of joints corresponding to the target persona may be learned based on the identification code, the voice information, and the motion information.

The agency generation model 530 may include a TTS model 536 that learns the voice of the target persona based on the identification code and the text information, a face motion model 532 that learns the face motion of the target persona based on the identification code, the voice information, and the face information, and a body motion model 534 that learns 3D rotation parameters of joints corresponding to the target persona based on the identification code, the voice information, and the motion information.

The TTS model 536 of the agency generation model 530 may identify the target persona by using the identification code, may convert text information into audio data, and may learn the voice of the target persona.

The face motion model 532 of the agency generation model 530 may identify the target persona by using the identification code, and may learn the face motion of the target persona so as to be synchronized with the voice timing of the target persona based on a sentence corresponding to the voice of the target persona, timing information of words in the sentence, voice information including voice features of the target persona, and face information including face motion data of the target persona.

The body motion model 534 of the agency generation model 530 may identify the target persona by using the identification code, and may learn 3D rotation parameters of joints corresponding to the target persona so as to be synchronized with the voice timing of the target persona based on a sentence corresponding to the voice of the target persona, timing information of words within the sentences, voice information including voice features of the target persona, and operation information including 3D rotation parameters of joints corresponding to the motion of the target persona and motion control reference values for each body part of the target persona.

Figure 16:
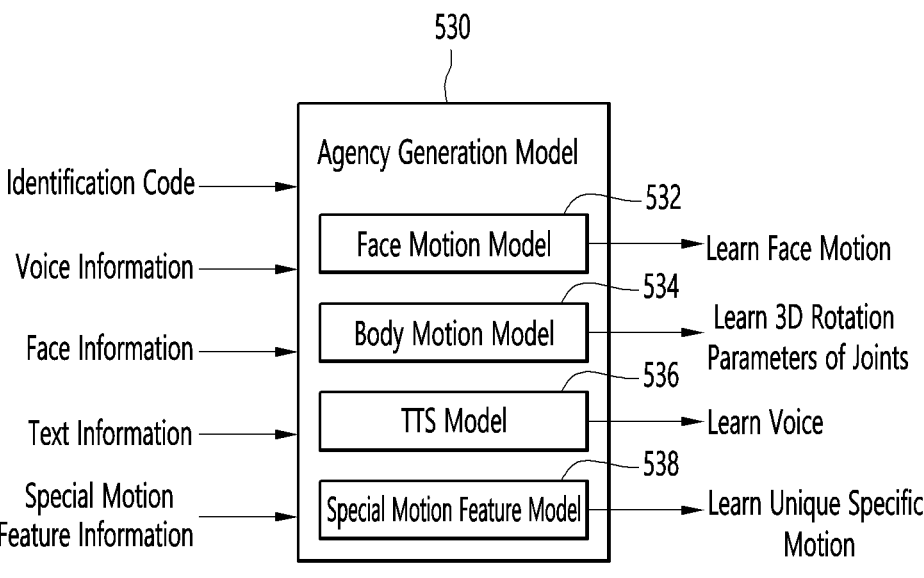
FIG. 16 is a diagram for describing an agency generation model of the AI device according to still another embodiment of the present disclosure.

FIG. 16 is a diagram for describing an agency generation model of the AI device according to still another embodiment of the present disclosure.

As illustrated in FIG. 16, in the present disclosure, a dataset including identification code, voice information, face information, motion information, text information, and predetermined motion feature information corresponding to the target persona may be input to an agency generation model 530, and the voice of the target persona may be learned based on the identification code and the text information. The face motion of the target persona may be learned based on the identification code, the voice information, and the face information. 3D rotation parameters of joints corresponding to the target persona may be learned based on the identification code, the voice information, and the motion information. A unique specific motion of the target persona may be learned based on the identification code and the predetermined motion feature information.

The agency generation model 530 may include a TTS model 536 that learns the voice of the target persona based on the identification code and the text information, a face motion model 532 that learns the face motion of the target persona based on the identification code, the voice information, and the face information, a body motion model 534 that learns 3D rotation parameters of joints corresponding to the target persona based on the identification code, the voice information, and the motion information, and a predetermined motion feature model 538 that learns a unique specific motion of the target persona based on the identification code and the predetermined motion feature information.

The TTS model 536 of the agency generation model 530 may identify the target persona by using the identification code, may convert text information into audio data, and may learn the voice of the target persona.

The face motion model 532 of the agency generation model 530 may identify the target persona by using the identification code, and may learn the face motion of the target persona so as to be synchronized with the voice timing of the target persona based on a sentence corresponding to the voice of the target persona, timing information of words in the sentence, voice information including voice features of the target persona, and face information including face motion data of the target persona.

The body motion model 534 of the agency generation model 530 may identify the target persona by using the identification code, and may learn 3D rotation parameters of joints corresponding to the target persona so as to be synchronized with the voice timing of the target persona based on a sentence corresponding to the voice of the target persona, timing information of words within the sentences, voice information including voice features of the target persona, and operation information including 3D rotation parameters of joints corresponding to the motion of the target persona and motion control reference values for each body part of the target persona.

In addition, the predetermined motion feature model 538 of the agency generation model 530 may use the identification code to identify the target persona, and may learn the unique specific motion of the target persona by controlling a weight so that the weight is lowered for a specific motion having a negative meaning and is increased for a specific motion having a positive meaning, based on the predetermined motion feature information of the target persona.

Figure 17:
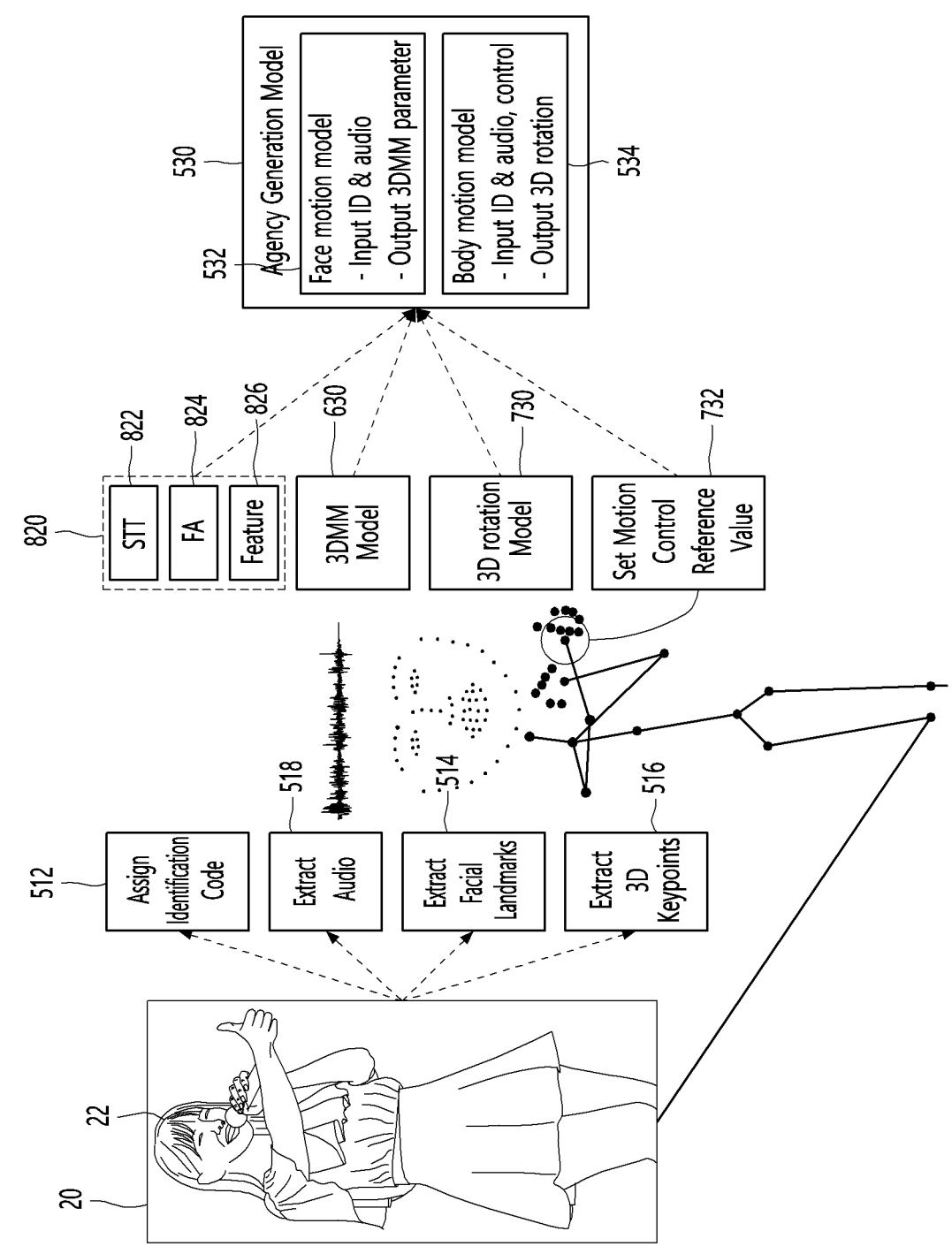
FIG. 17 is a diagram for describing a learning process of the agency generation model of the AI device according to an embodiment of the present disclosure.

FIG. 17 is a diagram for describing the learning process of the agency generation model of the AI device according to an embodiment of the present disclosure.

As illustrated in FIG. 17, in the present disclosure, when a 2D image 20 including a target persona 22 is input, an identification code may be assigned to the target persona 22 included in the 2D image 20 through an identification code unit 512.

In the present disclosure, a training dataset including voice information, face information, and motion information corresponding to the target persona 22 may be extracted, and the training dataset may be stored in a memory for each identification code of the target persona 22.

In the present disclosure, a facial landmark may be extracted from the face of the target persona 22 included in the 2D image 20 through a face information extraction unit 514. The 2D image 20 and the facial landmark of the target persona 22 may be input to a pre-trained first neural network model 630 to extract face information including face motion data of the target persona 22.

For example, the first neural network model 630 may include a 3DMM algorithm, but this is only an example, and the present disclosure is not limited thereto.

In addition, in the present disclosure, 3D keypoints for joint positions may be extracted from the body of the target persona 22 included in the 2D image 20 through a motion information extractor 516. The 2D image 20 and the 3D keypoints of the target persona 22 may be input to a pre-trained second neural network model 730 to extract motion information including 3D rotation parameters of joints corresponding to the motion of the target persona 22.

For example, the second neural network model 730 may include a 3D rotation model algorithm, but this is only an example, and the present disclosure is not limited thereto.

In addition, in the present disclosure, the motion degree of each joint may be analyzed based on the 3D rotation parameters through a motion control reference value setting unit 732, and motion control reference values may be set for each body part of the target persona 22 in each frame of the 2D image 20.

For example, the motion control reference value may include motion control reference values for a hand position and a motion speed thereof, a head position and a motion speed thereof, a foot position and a motion speed thereof, a neck position and a motion speed thereof, an arm position and a motion speed thereof, a leg position and a motion speed thereof, a waist position and a motion speed thereof among the body parts of the target persona 22, but this is only an example, and the present disclosure is not limited thereto.

In addition, in the present disclosure, audio data of the target persona 22 included in the 2D image 20 may be extracted through an audio information extraction unit 518. The audio data may be input to a pre-trained third neural network model 820 to extract voice information including a sentence corresponding to the voice of the target persona 22, timing information of words in the sentence, and voice features of the target persona 22.

For example, the third neural network model may convert audio data into text through a speech to text (STT) model 822 to extract a sentence corresponding to the voice of the target persona 22, may extract timing information of words in the sentence extracted from the voice of the target persona 22 through a forced alignment model, and may extract voice features of the target persona 22 from the audio data through a voice model 826.

Next, in the present disclosure, a dataset including identification code, voice information, face information, and motion information corresponding to the target persona 22 may be input to an agency generation model 530, and the face motion of the target persona 22 may be learned based on the identification code, the voice information, and the face information. 3D rotation parameters of joints corresponding to the target persona 22 may be learned based on the identification code, the voice information, and the motion information.

The face motion model 532 of the agency generation model 530 may learn the face motion of the target persona 22 so as to be synchronized with the voice timing of the target persona 22 based on a sentence corresponding to the voice of the target persona 22, timing information of words in the sentence, voice information including the voice features of the target persona 22, and face information including face motion data of the target persona 22.

The body motion model 534 of the agency generation model 530 may learn 3D rotation parameters of joints corresponding to the target persona 22 so as to be synchronized with the voice timing of the target persona 22 based on a sentence corresponding to the voice of the target persona 22, timing information of words in the sentence, voice information including voice features of the target persona 22, and motion information including 3D rotation parameters of joints corresponding to the motion of the target persona 22 and motion control reference values for each body part of the target persona 22.

Figure 18:
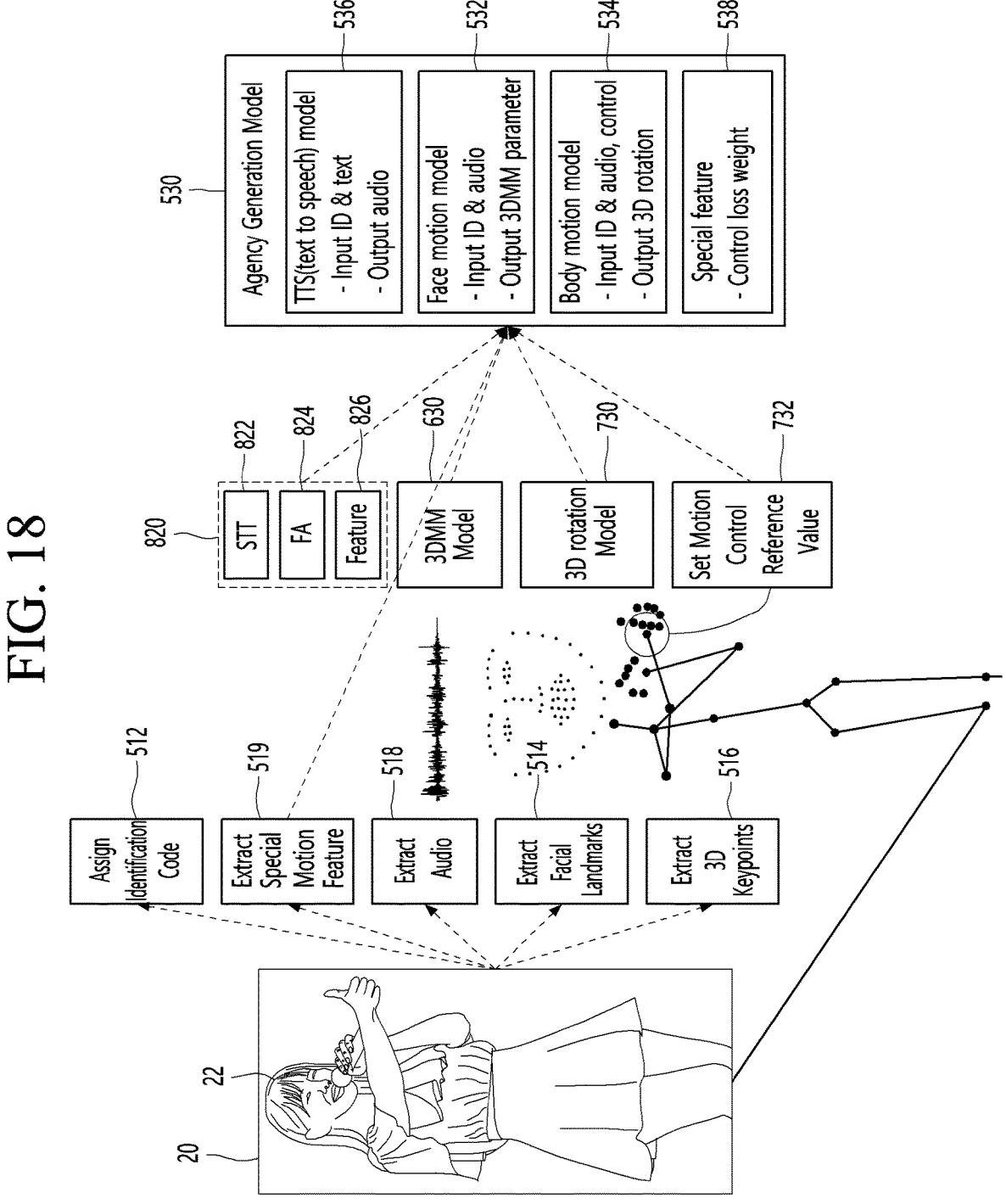
FIG. 18 is a diagram for describing a learning process of the agency generation model of the AI device according to another embodiment of the present disclosure.

FIG. 18 is a diagram for describing a learning process of the agency generation model of the AI device according to another embodiment of the present disclosure.

As illustrated in FIG. 18, in the present disclosure, when a 2D image 20 including a target persona 22 is input, an identification code may be assigned to the target persona 22 included in the 2D image 20 through an identification code unit 512.

In the present disclosure, a training dataset including voice information, face information, and motion information corresponding to the target persona 22 may be extracted, and the training dataset may be stored in a memory for each identification code of the target persona 22.

In the present disclosure, a facial landmark may be extracted from the face of the target persona 22 included in the 2D image 20 through a face information extraction unit 514. The 2D image 20 and the facial landmark of the target persona 22 may be input to a pre-trained first neural network model 630 to extract face information including face motion data of the target persona 22.

For example, the first neural network model 630 may include a 3DMM algorithm, but this is only an example, and the present disclosure is not limited thereto.

In addition, in the present disclosure, 3D keypoints for joint positions may be extracted from the body of the target persona 22 included in the 2D image 20 through a motion information extractor 516. The 2D image 20 and the 3D keypoints of the target persona 22 may be input to a pre-trained second neural network model 730 to extract motion information including 3D rotation parameters of joints corresponding to the motion of the target persona 22.

For example, the second neural network model 730 may include a 3D rotation model algorithm, but this is only an example, and the present disclosure is not limited thereto.

In addition, in the present disclosure, the motion degree of each joint may be analyzed based on the 3D rotation parameters through a motion control reference value setting unit 732, and operation control reference values may be set for each body part of the target persona 22 in each frame of the 2D image 20.

For example, the motion control reference value may include motion control reference values for a hand position and a motion speed thereof, a head position and a motion speed thereof, a foot position and a motion speed thereof, a neck position and a motion speed thereof, an arm position and a motion speed thereof, a leg position and a motion speed thereof, a waist position and a motion speed thereof among the body parts of the target persona 22, but this is only an example, and the present disclosure is not limited thereto.

In addition, in the present disclosure, audio data of the target persona 22 included in the 2D image 20 may be extracted through an audio information extraction unit 518. The audio data may be input to a pre-trained third neural network model 820 to extract voice information including a sentence corresponding to the voice of the target persona 22, timing information of words in the sentence, and voice features of the target persona 22.

For example, the third neural network model may convert audio data into text through a speech to text (STT) model 822 to extract a sentence corresponding to the voice of the target persona 22, may extract timing information of words in the sentence extracted from the voice of the target persona 22 through a forced alignment model, and may extract voice features of the target persona 22 from the audio data through a voice model 826.

In addition, in the present disclosure, a training dataset including predetermined motion feature information may be extracted from the target persona 22 included in the 2D image 20 through the predetermined motion feature extractor 519, and the training dataset including predetermined motion feature information may be stored in a memory for each identification code of the target persona 22.

In the present disclosure, when extracting the training dataset including the predetermined motion feature information, a specific section may be selected from the 2D image 20 including the target persona 22, face information and motion information extracted from the target persona 22 of the 2D image 20 corresponding to the selected specific section may be vectorized, and the distribution of the vectorized data may be analyzed to confirm whether there is data whose occurrence frequency is equal to or higher than a reference frequency. When there is the data whose occurrence frequency is equal to or higher than the reference frequency, the corresponding data may be determined as the predetermined motion feature. Predetermined motion feature information may be extracted based on the face information and the motion information of the specific section corresponding to the data determined as the predetermined motion feature.

For example, in the present disclosure, at least one of a unique facial expression, a unique gesture, and a unique body motion of the target persona 22 may be recognized as the predetermined motion of the target persona 22.

Next, in the present disclosure, a dataset including identification code, voice information, face information, motion information, text information, and predetermined motion feature information corresponding to the target persona 22 may be input to the agency creation model 530, and the face motion the target persona 22 may be learned based on the identification code, the voice information, and the face information. 3D rotation parameters of joints corresponding to the target persona 22 may be learned based on the identification code, the voice information, and the motion information. A unique specific motion of the target persona 22 may be learned based on the identification code and the predetermined motion feature information. The voice of the target persona may be learned based on the identification code and the text information.

The face motion model 532 of the agency generation model 530 may learn the face motion of the target persona 22 so as to be synchronized with the voice timing of the target persona 22 based on a sentence corresponding to the voice of the target persona 22, timing information of words in the sentence, voice information including the voice features of the target persona 22, and face information including face motion data of the target persona 22.

The body motion model 534 of the agency generation model 530 may learn 3D rotation parameters of joints corresponding to the target persona 22 so as to be synchronized with the voice timing of the target persona 22 based on a sentence corresponding to the voice of the target persona 22, timing information of words in the sentence, voice information including voice features of the target persona 22, and operation information including 3D rotation parameters of joints corresponding to the motion of the target persona 22 and motion control reference values for each body part of the target persona 22.

In addition, the predetermined motion feature model 538 of the agency generation model 530 may learn the unique specific motion of the target persona 22 by controlling a weight so that the weight is lowered for a specific motion having a negative meaning and is increased for a specific motion having a positive meaning, based on the predetermined motion feature information of the target persona 22.

In addition, the TTS model 536 of the agency generation model 530 may learn the voice of the target persona based on the identification code and the text information.

Figure 19:
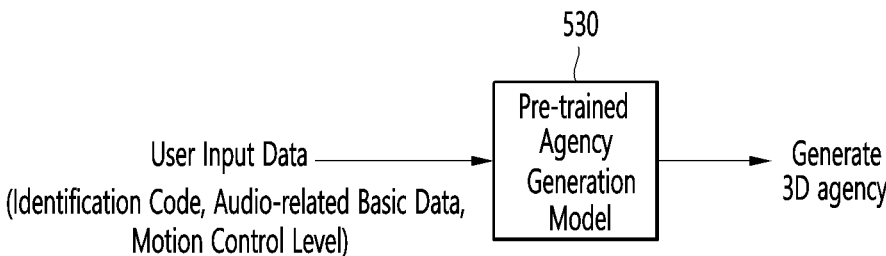
FIGS. 19 and 20 are diagrams for describing a three-dimensional (3D) agency generating process of the AI device according to an embodiment of the present disclosure.
Figure 20:
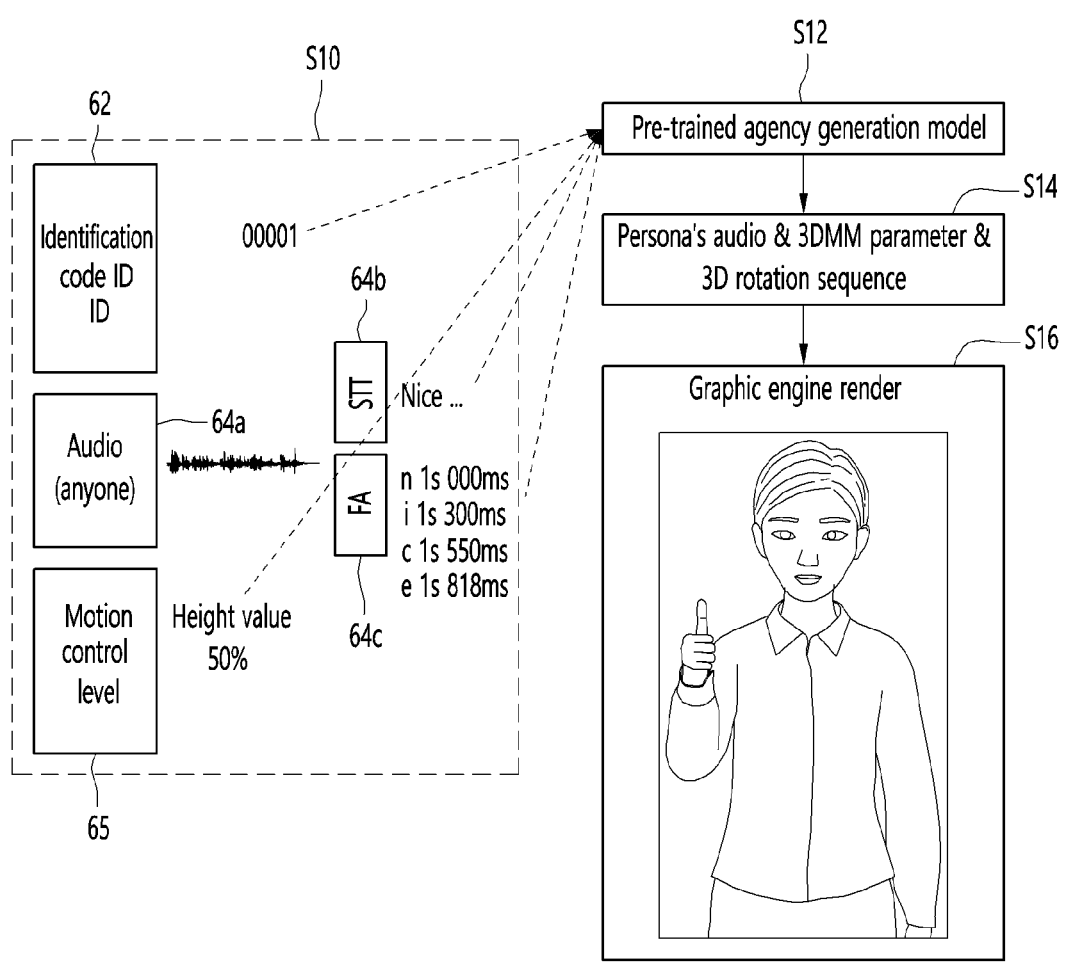

FIGS. 19 and 20 are diagrams for describing the 3D agency generating process of the AI device according to an embodiment of the present disclosure.

As illustrated in FIGS. 19 and 20, in the present disclosure, when user input data for generating a 3D agency is received, it may be confirmed whether identification code 62 of target persona, audio-related basic data 64, and motion control level 65 are included in the user input data (S10).

The audio-related basic data 64 may include a normal voice 64*a* that the user intends to apply to the 3D agency, a sentence 64*b* corresponding to the normal voice, and timing information 64*c* required for synchronizing the normal voice and the sentence.

In addition, in the present disclosure, when the motion control level 65 is not included in the user input data, a motion control reference value for each body part of the target persona pre-stored in a memory may be input to an agency generation model 530.

Next, in the present disclosure, the user input data including the identification code 62, the audio-related basic data 64, and the motion control level 65 may be input to the pre-trained agency generation model 530 (S12).

Next, in the present disclosure, voice, face motion, and body motion of the target persona may be output through the pre-trained agency generation model 530 (S14).

For example, in the present disclosure, face motion parameters and 3D rotation parameters of joints corresponding to the audio data of the target persona 22 may be output through a dataset of the target persona corresponding to the identification code 00001.

In addition, in the present disclosure, a 3D agency expressing user-specific normal voice features and unique motion features of the target persona may be generated based on the voice, the face motion, and the body motion through graphic engine rendering (S16).

In the present disclosure, when the normal voice that the user intends to apply to the 3D agency is included in the audio-related basic data, the 3D agency expressing normal voice features that the user intends to apply may be generated instead of the voice features of the target persona.

For example, in the present disclosure, when the 3D agency targeting the target persona frequently performing a hand motion to raise thumb with a lively voice is generated, the 3D agency may provide answers to the user's inquiries with a lively voice and provide unique motion features such as a hand motion to raise thumb.

The voice of the 3D agency may have a voice designated by the user, but may have a voice intonation of the target persona through learning.

Figure 21:
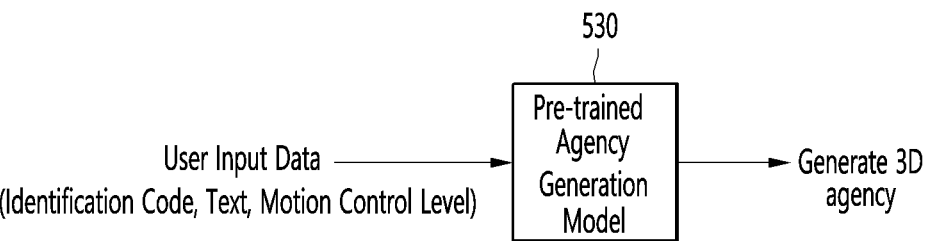
FIGS. 21 and 22 are diagrams for describing a 3D agency generating process of the AI device according to another embodiment of the present disclosure.
Figure 22:
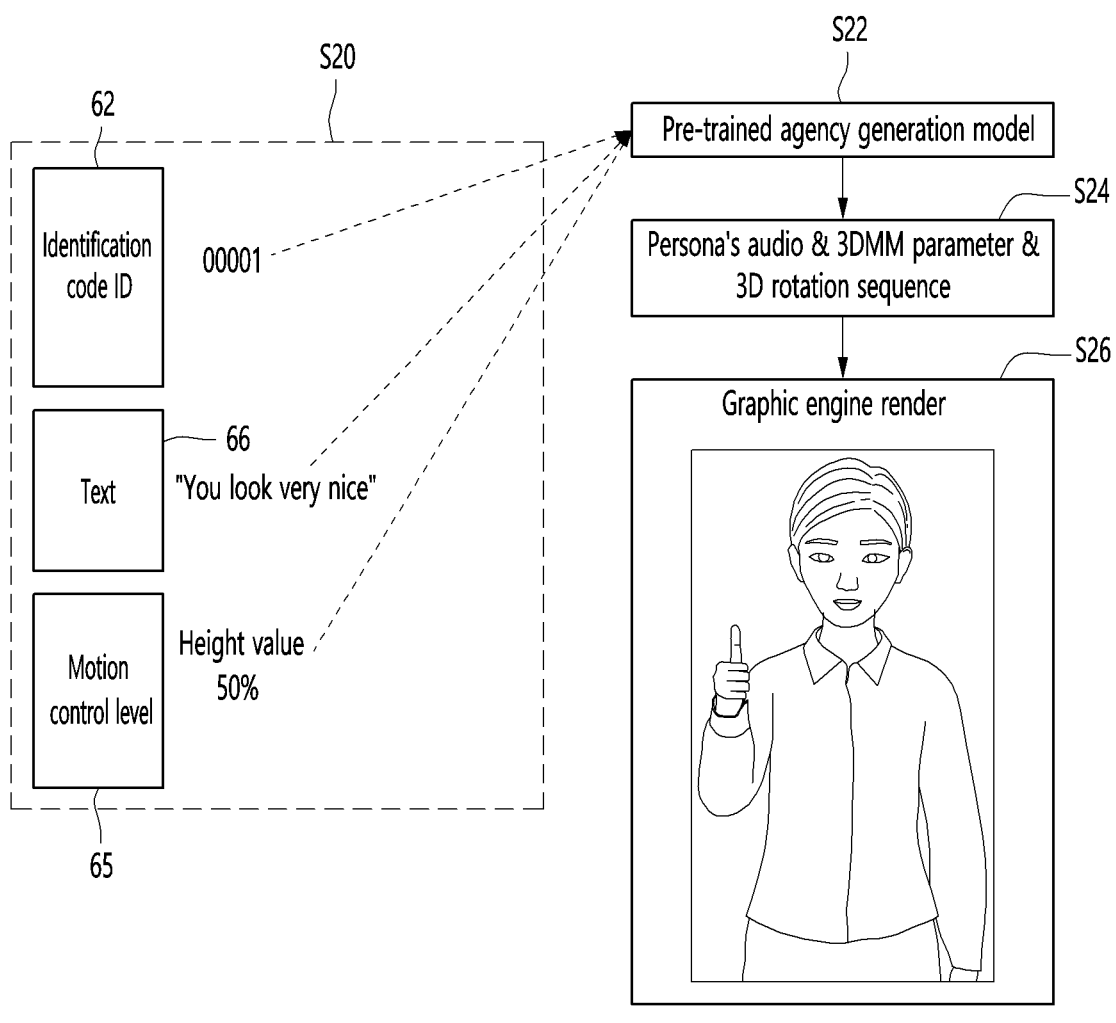

FIGS. 21 and 22 are diagrams for describing the 3D agency generating process of the AI device according to another embodiment of the present disclosure.

As illustrated in FIGS. 21 and 22, in the present disclosure, when user input data for generating a 3D agency is received, it may be confirmed whether identification code 62 of target persona, text 66, and motion control level 65 are included in the user input data (S20).

In the present disclosure, when the motion control level 65 is not included in the user input data, a motion control reference value for each body part of the target persona pre-stored in a memory may be input to an agency generation model 530.

Next, in the present disclosure, the user input data including the identification code 62, the text 66, and the motion control level 65 may be input to the pre-trained agency generation model 530 (S22).

Next, in the present disclosure, voice, face motion, and body motion of the target persona may be output through the pre-trained agency generation model 530 (S24).

For example, in the present disclosure, face motion parameters and 3D rotation parameters of joints corresponding to the audio data of the target persona 22 may be output through a dataset of the target persona corresponding to the identification code 00001.

In the present disclosure, the 3D agency expressing user-specific normal voice features and unique motion features of the target persona may be generated based on the voice, the face motion, and the body motion through graphic engine rendering (S26).

According to the present disclosure, when text is included in the user input data, the 3D agency expressing the contents of the text as the unique voice features of the target persona may be generated.

For example, in the present disclosure, when the 3D agency targeting the target persona frequently performing a hand motion to raise thumb with a lively voice is generated, the 3D agency may provide answers to the user's inquiries with a lively voice and provide unique motion features such as a hand motion to raise thumb.

The voice of the 3D agency may have the same voice as the target persona and the intonation and mood thereof through learning.

Figures 23, 24:
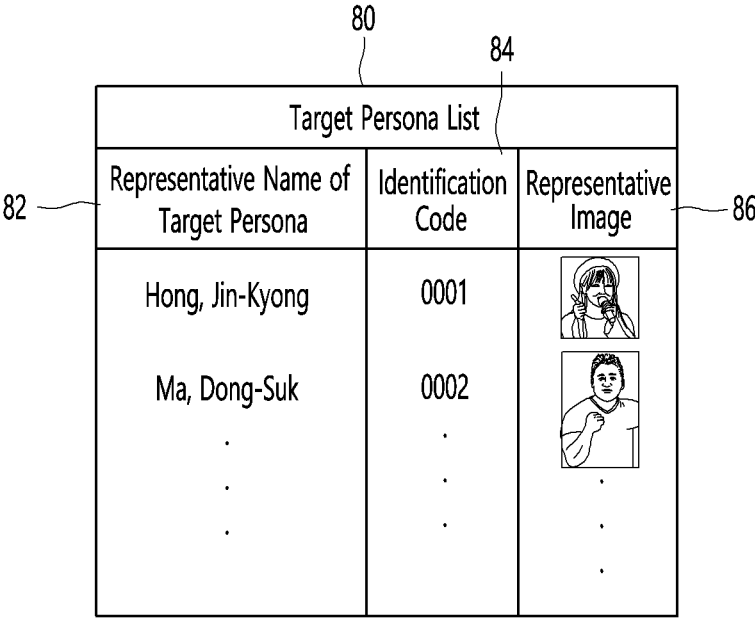
FIGS. 23 and 24 are diagrams for describing a target persona list table of the AI device according to an embodiment of the present disclosure.

FIGS. 23 and 24 are diagrams for describing a target persona list table of the AI device according to an embodiment of the present disclosure.

As illustrated in FIG. 23, in the present disclosure, when the user input of requesting the target persona list is received before the user input data for generating the 3D agency is received, a target persona list table 80 including a representative name 82 corresponding to a target persona pre-stored in a memory and an identification code 84 thereof may be provided.

In the present disclosure, when the user input of selecting a predetermined target persona from the target persona list table 80 is received, the identification code of the selected target persona may be acquired, and the acquired identification code may be recognized as the user input data for generating the 3D agency.

In some cases, as illustrated in FIG. 24, the target persona list table 80 may further include a representative image 86 corresponding to the target persona pre-stored in the memory.

For example, the target persona list table 80 may include a representative name 82 corresponding to the target persona, an identification code 84 of the target persona, and a representative image 86 corresponding to the target persona.

Therefore, in the present disclosure, when receiving the user input of requesting the target persona list, the target persona list table 80 may be provided, thereby providing user convenience so that the user can easily and conveniently select the target persona to be generated as the 3D agency through the target persona list table 80.

Figure 25:
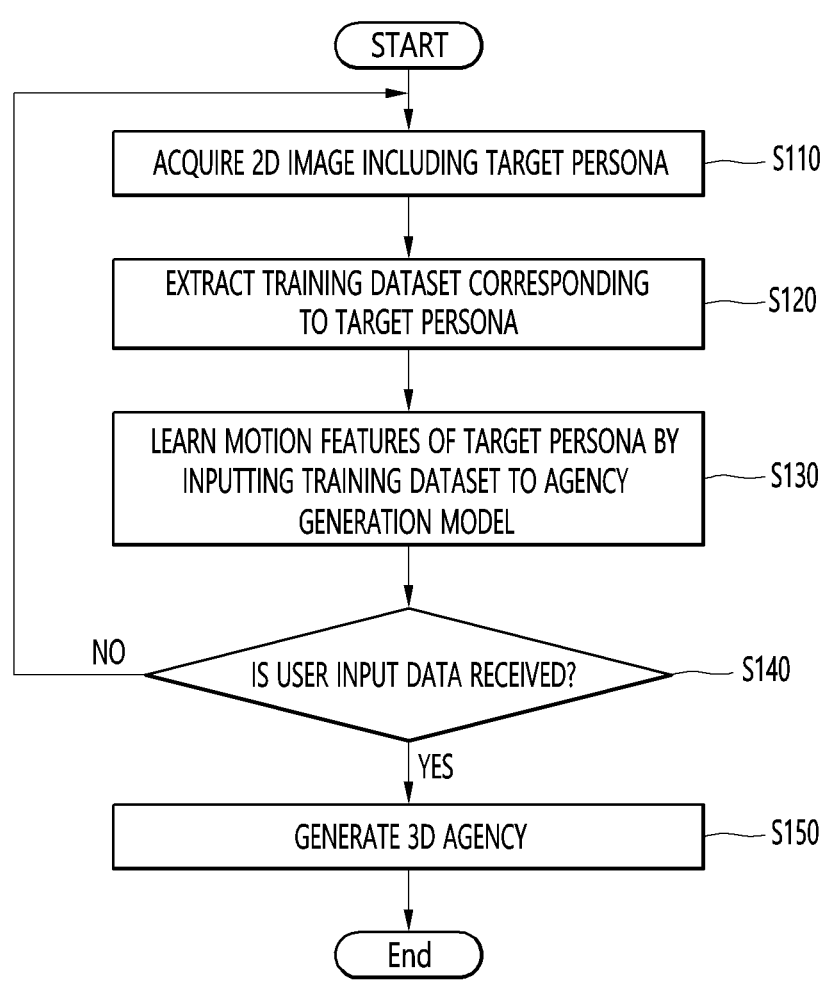
FIG. 25 is a diagram for describing the overall operation flow of the AI device according to an embodiment of the present disclosure.

FIG. 25 is a diagram for describing the overall operation flow of the AI device according to an embodiment of the present disclosure.

As illustrated in FIG. 25, in the present disclosure, a 2D image including a target persona may be acquired (S110).

In addition, in the present disclosure, the 2D image may be pre-processed to extract a training dataset including voice information, face information, and motion information corresponding to the target persona (S120).

In the present disclosure, it may be confirmed whether a pre-selected target persona is included in the 2D image. When the target persona is included in the 2D image, an identification code is assigned to the target persona included in the 2D image. The training dataset including the voice information, the face information, and the motion information corresponding to the target persona to which the identification code is assigned may be extracted. The training dataset may be stored in a memory for each identification code of the target persona.

Next, in the present disclosure, the motion features of the target persona may be learned by inputting the training dataset to an agency generation model (S130).

In the present disclosure, the dataset including the identification code, the voice information, the face information, and the motion information corresponding to the target persona may be input to the agency generation model, and the face motion of the target persona may be learned based on the identification code, the voice information, and the face information. 3D rotation parameters of joints corresponding to the target persona may be learned based on the identification code, the voice information, and the motion information.

In some cases, in the present disclosure, when the dataset including the identification code, the voice information, the face information, the motion information, and the text information corresponding to the target persona is input, the voice of the target persona may be learned based on the identification code and the text information. The face motion of the target persona may be learned based on the identification code, the voice information, and the face information. The 3D rotation parameters of joints corresponding to the target persona may be learned based on the identification code, the voice information, and the motion information.

In other cases, the dataset including identification code, voice information, face information, motion information, text information, and predetermined motion feature information corresponding to the target persona may be input to the agency generation model, and the voice of the target persona may be learned based on the identification code and the text information. The face motion of the target persona may be based on the identification code, the voice information, and the face information. 3D rotation parameters of joints corresponding to the target persona may be learned based on the identification code, the voice information, and the motion information. The unique specific motion of the target persona may be learned based on the identification code and the predetermined motion feature information.

Next, in the present disclosure, it may be confirmed whether the user input data for generating the 3D agency is received (S140).

In the present disclosure, when the user input data for generating the 3D agency is received, the 3D agency expressing the motion features of the target persona may be generated by inputting the user input data to the pre-trained agency generation model (S150).

When the user input data for generating the 3D agency is received, it may be confirmed whether the identification code, the audio-related basic data, and the motion control level of the target persona are included in the user input data. The user input data including the identification code, the audio-related basic data, and the motion control level may be input to the pre-trained agency generation model, and the voice, face motion, and body motion of the target persona may be output. The 3D agency expressing the user-specific normal voice features and the unique motion features of the target persona may be generated based on the voice, the face motion, and the body motion.

For example, in the present disclosure, when the normal voice that the user intends to apply to the 3D agency is included in the audio-related basic data, the 3D agency expressing normal voice features that the user intends to apply may be generated instead of the voice features of the target persona.

In some cases, in the present disclosure, when the user input data for generating the 3D agency is received, it may be confirmed whether the identification code, text, and motion control level of the target persona are included in the user input data. The user input data including the identification code, the text, and the motion control level may be input to the pre-trained agency-generation model, and the voice, face motion, and body motion of the target persona may be output. The 3D agency expressing the unique motion features and unique voice features of the target persona may be generated based on the voice, the face motion, and the body motion.

According to the present disclosure, when text is included in the user input data, the 3D agency expressing the contents of the text as the unique voice features of the target persona may be generated.

As described above, in the present disclosure, it is possible to extract the training dataset including the voice information, the face information, and the motion information corresponding to the target persona of the 2D image, to input the training dataset to the agency generation model, to learn the motion features of the target persona, and to generate the 3D agency that can realistically express even the unique detailed motion features of the target persona.

In addition, in the present disclosure, it is possible to extract unique and predetermined motion feature information for each target persona, to learn a unique specific motion of the target persona, and to generate a 3D agency expressing the unique specific motion of the target persona, thereby providing fun and interest to customers.

In addition, in the present disclosure, it is possible to learn the actual voice of the target persona or the voice that the user intends to apply, and to generate a 3D agency expressing not only the unique voice of the target persona but also the applied voice of the user, thereby providing a variety of services to customers.

According to an embodiment of the disclosure, an AI device may extract a training dataset including voice information, face information, and motion information corresponding to a target persona of a two-dimensional (2D) image, input the training dataset to an agency generation model, learn motion features of the target persona, and generate a three-dimensional (3D) agency that can realistically express even unique detailed motion features of the target persona.

In addition, in the present disclosure, it is possible to extract unique and predetermined motion feature information for each target persona, to learn a unique specific motion of the target persona, and to generate a 3D agency expressing the unique specific motion of the target persona, thereby providing fun and interest to customers.

In addition, in the present disclosure, it is possible to learn the actual voice of the target persona or the voice that the user intends to apply, and to generate a 3D agency expressing not only the unique voice of the target persona but also the applied voice of the user, thereby providing a variety of services to customers.

An AI device according to the present disclosure has an effect that can extract a training dataset including voice information, face information, and motion information corresponding to a target persona of a 2D image, can input the training dataset to an agency generation model, can learn motion features of the target persona, and can generate a 3D agency that can realistically express even unique detailed motion features of the target persona. Therefore, the AI device according to the present disclosure is remarkably industrially applicable.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. In addition, the computer may include the processor 180 of the AI device.

What is claimed is:

1. An artificial intelligence device comprising:
a memory configured to store training datasets for a target persona; and
a processor configured to generate a three-dimensional agency corresponding to the target persona by using the training dataset for the target persona,
wherein the processor is configured to:
acquire a two-dimensional image including the target persona;

pre-process the two-dimensional image to extract a training dataset including voice information, face information, and motion information corresponding to the target persona;
input the training dataset to an agency generation model to learn one or more motion features of the target persona; and
upon receiving user input data for generating the three-dimensional agency, inputting the user input data to a pre-trained agency generation model to generate the three-dimensional agency, the generated three-dimensional agency expressing the one or more motion features of the target persona,
wherein the processor is further configured to:
when learning the one or more motion features of the target persona, input a dataset including an identification code, voice information, face information, motion information, text information, and predetermined motion feature information corresponding to the target persona to the agency generation model;
learn a voice of the target persona based on the identification code and the text information;
learn a face motion of the target persona based on the identification code, the voice information, and the face information;
learn three-dimensional rotation parameters of joints corresponding to the target persona based on the identification code, the voice information, and the motion information; and
learn a unique specific motion of the target persona based on the identification code and the predetermined motion feature information,
wherein the processor is further configured to:
when learning a unique specific motion of the target persona, use the identification code to identify the target persona; and
learn the unique specific motion of the target persona by controlling a weight so that the weight is lowered for a specific motion having a negative meaning and is increased for a specific motion having a positive meaning, based on the predetermined motion feature information of the target persona.

2. The artificial intelligence device of claim 1, wherein the processor is configured to:
when pre-processing the two-dimensional image, confirm whether a pre-selected target persona is included in the acquired two-dimensional image;
when the target persona is included in the two-dimensional image, assign an identification code to the target persona included in the two-dimensional image;
extract the training dataset corresponding to the target persona to which the identification code is assigned; and
store the training dataset in the memory for each identification code of the target persona.

3. The artificial intelligence device of claim 2, wherein the processor is configured to:
when extracting the training dataset including the face information, extract a facial landmark from a face of the target persona included in the two-dimensional image; and
input the two-dimensional image and the facial landmark of the target persona to a pre-trained first neural network model to extract face information including face motion data of the target persona.

4. The artificial intelligence device of claim 2, wherein the processor is configured to:

when extracting the training dataset including the motion information, extract three-dimensional keypoints for joint positions from a body of the target persona included in the two-dimensional image; and input the two-dimensional image and the three-dimensional keypoints of the target persona to a pre-trained second neural network model to extract motion information including three-dimensional rotation parameters of joints corresponding to the motion of the target persona.

5. The artificial intelligence device of claim 2, wherein the processor is configured to:

extract a training dataset including predetermined motion feature information from the target persona included in the two-dimensional image; and store the training dataset including the predetermined motion feature information in the memory for each identification code of the target persona.

6. The artificial intelligence device of claim 1, wherein the processor is configured to:

when learning the face motion of the target persona, identify the target persona by using the identification code; and learn the face motion of the target persona so as to be synchronized with voice timing of the target persona based on a sentence corresponding to a voice of the target persona, timing information of words in the sentence, voice information including one or more voice features of the target persona, and face information including face motion data of the target persona.

7. The artificial intelligence device of claim 1, wherein the processor is configured to:

when learning the three-dimensional rotation parameters of the joints corresponding to the target persona, identify the target persona by using the identification code; and learn the three-dimensional rotation parameters of the joints corresponding to the target persona so as to be synchronized with voice timing of the target persona based on a sentence corresponding to a voice of the target persona, timing information of words within the sentences, voice information including one or more voice features of the target persona, and motion information including the three-dimensional rotation parameters of the joints corresponding to the motion of the target persona and motion control reference values for each body part of the target persona.

8. The artificial intelligence device of claim 1, wherein the processor is configured to:

when generating the three-dimensional agency, if the user input data for generating the three-dimensional agency is received, confirm whether identification code, audio-related basic data, and motion control level of the target persona are included in the user input data;

input the user input data including the identification code, the audio-related basic data, and the motion control level to the pre-trained agency generation model and output voice, face motion, and body motion of the target persona; and generate a three-dimensional agency expressing one or more user-specific normal voice features and one or more unique motion features of the target persona based on the voice, the face motion, and the body motion.

9. The artificial intelligence device of claim 8, wherein the audio-related basic data includes a normal voice that a user intends to apply to the three-dimensional agency, a sentence corresponding to the normal voice, and timing information required for synchronizing the normal voice and the sentence.

10. The artificial intelligence device of claim 9, wherein the processor is configured to:

when the normal voice that the user intends to apply to the three-dimensional agency is included in the audio-related basic data, the three-dimensional agency expressing one or more normal voice features that the user intends to apply is generated instead of the one or more voice features of the target persona.

11. The artificial intelligence device of claim 1, wherein the processor is configured to:

when generating the three-dimensional agency, if the user input data for generating the three-dimensional agency is received, confirm whether identification code, text, and motion control level of the target persona are included in the user input data;

input the user input data including the identification code, the text, and the motion control level to the pre-trained agency generation model and output voice, face motion, and body motion of the target persona; and generate a three-dimensional agency expressing one or more unique voice features and one or more unique motion features of the target persona based on the voice, the face motion, and the body motion.

12. The artificial intelligence device of claim 11, wherein the processor is configured to, when the text is included in the user input data, generate a three-dimensional agency expressing contents of the text as the one or more unique voice features of the target persona.

13. A three-dimensional agency generating method of an artificial intelligence device, the three-dimensional agency generating method comprising:

acquiring a two-dimensional image including a target persona;

pre-processing the two-dimensional image to extract a training dataset including voice information, face information, and motion information corresponding to the target persona;

inputting the training dataset to an agency generation model to learn one or more motion features of the target persona;

confirming whether user input data for generating the three-dimensional agency is received; and when the user input data for generating the three-dimensional agency is received, inputting the user input data to a pre-trained agency generation model to generate the three-dimensional agency expressing the one or more motion features of the target persona, wherein the method further comprises:

when learning the one or more motion features of the target persona, inputting a dataset including an identification code, voice information, face information, motion information, text information, and predetermined motion feature information corresponding to the target persona to the agency generation model;

learning a voice of the target persona based on the identification code and the text information;

learning a face motion of the target persona based on the identification code, the voice information, and the face information;

learning three-dimensional rotation parameters of joints corresponding to the target persona based on the identification code, the voice information, and the motion information; and learning a unique specific motion of the target persona based on the identification code and the predetermined motion feature information, wherein the method further comprises:

when learning a unique specific motion of the target persona, using the identification code to identify the target persona; and learning the unique specific motion of the target persona by controlling a weight so that the weight is lowered for a specific motion having a negative meaning and is increased for a specific motion having a positive meaning, based on the predetermined motion feature information of the target persona.

\* \* \* \* \*